(12) United States Patent
Tanaka et al.

(10) Patent No.: US 7,927,046 B2
(45) Date of Patent: Apr. 19, 2011

(54) RADIUS END MILL

(75) Inventors: Hiromitsu Tanaka, Akashi (JP);
Nobukazu Horiike, Tsukuba (JP);
Masaya Tsuchitani, Tsukuba (JP)

(73) Assignee: Mitsubishi Materials Corporation, Tokyo (JP)

( * ) Notice: Subject to any disclaimer, the term of this patent is extended or adjusted under 35 U.S.C. 154(b) by 242 days.

(21) Appl. No.: 12/136,609

(22) Filed: Jun. 10, 2008

(65) Prior Publication Data
US 2008/0286056 A1 Nov. 20, 2008

Related U.S. Application Data

(63) Continuation of application No. 10/540,681, filed as application No. PCT/JP03/16477 on Dec. 22, 2003, now Pat. No. 7,402,004.

(30) Foreign Application Priority Data

Dec. 26, 2002 (JP) ................................. 2002-375687
Dec. 26, 2002 (JP) ................................. 2002-375688

(51) Int. Cl.
*B23C 5/10* (2006.01)
(52) U.S. Cl. ............................... 407/53; 407/54; 407/61
(58) Field of Classification Search .................. 407/53, 407/54, 61–63
See application file for complete search history.

(56) References Cited

U.S. PATENT DOCUMENTS

| 3,514,828 A | 6/1970 | Wale |
| 4,300,862 A | 11/1981 | Yada et al. |
| 5,433,655 A | 7/1995 | Shiokawa et al. |
| 5,855,458 A | 1/1999 | Reynolds et al. |
| 6,953,310 B2 | 10/2005 | Iwamoto et al. |
| 2002/0141833 A1 | 10/2002 | MacArthur |

FOREIGN PATENT DOCUMENTS

| JP | 59-175915 A | 10/1984 |
| JP | 60-142012 U | 9/1985 |

(Continued)

OTHER PUBLICATIONS

English Translation of JP 2000-000761A, Jan. 7, 2000.* Japanese Office Action mailed Apr. 6, 2010 for the corresponding Japanese Patent Application No. 2004-562890.

*Primary Examiner* — Boyer D Ashley
*Assistant Examiner* — Sara Addisu
(74) *Attorney, Agent, or Firm* — Leason Ellis LLP.

(57) ABSTRACT

In the radius end mill, main gash faces has an angle of inclination with respect to an axis that is smaller than a twist angle of chip discharge flutes. The main gash faces are formed on inner circumferential sides of distal end portions of wall surfaces that face in a tool rotation direction of helically twisted chip discharge flutes, which is formed on an outer circumference of a distal end portion of a tool body that is rotated around the axis. End cutting edges are formed on a distal end of the main gash faces. Sub gash faces has an angle of inclination with respect to the axis that is greater than that of the main gash faces. The sub gash faces are formed on an outer circumferential side of the main gash faces such that they extend away via step portions from the main gash faces. In addition, corner cutting edges that have a protruding arc-shaped contour are formed to be continuous with an outer circumferential side of the end cutting edges extending from a distal end as far as an outer circumference of the sub gash faces.

2 Claims, 20 Drawing Sheets

FOREIGN PATENT DOCUMENTS

| | | |
|---|---|---|
| JP | 6-218616 A | 8/1994 |
| JP | 7-20211 U | 4/1995 |
| JP | 09-267211 | 10/1997 |
| JP | 2000-000716 | 1/2000 |
| JP | 2000-052127 | 2/2000 |
| WO | 9420251 | 9/1994 |

* cited by examiner

RADIUS END MILL

CROSS-REFERENCE TO PRIOR APPLICATION

This application is a continuation of U.S. application Ser. No. 10/540,681, filed Jun. 23, 2005, which is a U.S. National Phase application under 35 U.S.C. §371 of International Patent Application No. PCT/JP2003/016477, filed Dec. 22, 2003, and claims the benefit of Japanese Patent Application No. 2002-375687, filed Dec. 26, 2002 and 2002-375688, filed Dec. 26, 2002, all of which are incorporated by reference herein. The International Application was published in Japanese on Jul. 15, 2004 as WO 2004/058438 A1 under PCT Article 21(2).

TECHNICAL FIELD

The present invention relates to a radius end mill that is used to cut a work piece such as, for example, a metal die.

BACKGROUND OF THE INVENTION

An example of a radius end mill that is used in the machining of a work piece in which a corner cutting edge, in which an end cutting edge and a peripheral cutting edge intersect, is formed in a convex arc shape is disclosed in Japanese Unexamined Patent Application, First Publication No. S59-175915.

As is shown in FIG. 31, in this radius end mill there is provided an end mill in which end cutting edges 2 are positioned at a distal end of a tool body 1 and peripheral cutting edges 3 are positioned at a predetermined twist angle $\theta_1$ on an outer circumference of the tool body 1. In this end mill, a twist angle $\theta_2$ of corner cutting edges 4 in the vicinity of a corner of the edge tip is smaller than the twist angle $\theta_1$ of the peripheral cutting edges 3 that are connected to the corner cutting edges 4. In addition, a corner R is provided on the corner cutting edges 4. In this type of radius end mill, because the small twist angle $\theta_2$ is provided in the vicinity of a distal end of the corner cutting edges 4, the edge tip corner does not form an extremely acute angle, and working of the corner R is simplified while accuracy may be maintained. In addition, there are no defects in the edge due to the thinness of the edge tip corner portion. Moreover, because the portions of the peripheral cutting edges 3, which are the centers of the machining, are provided with a large twist angle $\theta_1$, which has excellent machining properties, materials that are difficult to machine such as titanium alloys and stainless steel may be machined easily and with a high degree of accuracy. Furthermore, it is possible to achieve a marked improvement in reducing tool costs and in the processing efficiency of the milling tasks.

However, in this radius end mill, because the twist angle $\theta_2$ of the corner cutting edges 4, which are provided with a corner R, on the distal end side of the peripheral cutting edges 3 is made weak, namely, because the rake angle in the axial direction of the corner cutting edges 4 and the end cutting edges 2 that are connected to the corner cutting edges 4 and extend to the inner circumferential side is small, although the included angle of the end cutting edges 2 and corner cutting edges 4 may be enlarged and it is possible to prevent defects, as is described above, it is not possible to prevent the blunt. Whereas, if, for example, the depth of a cut is shallow, and the center of the cut is not on the peripheral cutting edge 3 side but is on the end cutting edge 2 side, then because the distance from the center axis O of the tool body 1 is short on the inner peripheral side of the end cutting edges 2, the cutting speed is slow. Accordingly, the load during the cutting is increased and greater edge tip strength is required. In contrast, because the cutting speed is fast at the corner cutting edges 4 on the outer peripheral side of the end cutting edges 2, the load during the cutting is light, and, instead of greater edge tip strength, what is required is a sharp cutting edge. However, in a radius end mill in which the axial direction rake angle is small extending from the end cutting edges 2 to the corner cutting edges 4, in the manner described above, on the contrary, there is a possibility that there will be an increase in the cutting resistance.

Moreover, in particular, if a slanted metal surface or curved metal surface is cut using this type of radius end mill, because a number of the corner cutting edges 4 that are provided with the corners R in the vicinity of the edge tip corners thereof are used, if the sharpness of the edges in portion such as this is poor and there is considerable cutting resistance, then there is no possibility of achieving an improvement in the processing efficiency. Furthermore, in the above described conventional radius end mill, because the peripheral cutting edges 3 that are connected to the corner cutting edges 4 are provided with twist angle gradual increase portions 5 that extend from the twist angle $\theta_2$ to the large fixed twist angle $\theta_1$ so that the twist angle is made to change gradually, and because, in conjunction with this, the rake faces that are continuous with the cutting edges 4 are also formed as smoothly continuous faces whose incline gradually changes, shavings that are produced by the corner cutting edges 4 are discharged in an elongated form along these rake faces, and the problem also arises that there is a deterioration in the ability to process these chips.

Furthermore, FIG. 32 is an enlarged view showing principal portions of this conventional radius end mill. Corner portions 6, which are convex on the corner cutting edge 4 side, are formed on rake faces 2A and 4A as a result of an inner edge 2B (i.e., a boundary line between the rake face 2A and a wall face that protrudes outwards on the front side in the rotation direction T of the tool from the rake face 2A) of the rake face 2A of the end cutting edge 2 and an inner edge 4B (i.e., a boundary line between the rake face 4A and a wall face that protrudes outwards on the front side in the rotation direction T of the tool from the rake face 4A) of the rake face 4A of the corner cutting edge 4 intersecting at an obtuse angle.

However, in this type of radius end mill, a shortening of the interval from the end cutting edges 2 and corner cutting edges 4 to the inner edges 2B and 4B that corresponds to the size of the corner portions 6, which are intersecting portions between the inner edges 2B of the rake faces 2A of the end cutting edges 2 and the inner edges 4B of the rake faces 4A of the corner cutting edges 4, may not be avoided. In conjunction with this, because it also becomes impossible to ensure a sufficiently large space for the discharging chips, the problem arises that there is deterioration in the ability to discharge the chips.

In particular, in a radius end mill in which a ratio r/D between a radius of curvature "r" of substantially arc-shaped portions formed by the corner cutting edges 4, which constitute the intersection portions (i.e., corner portions) between the peripheral cutting edges 3 and the end cutting edges 2, and a diameter D of the tool body 1 is set to 0.2 or more, or in a radius end mill in which the radius of curvature "r" of the substantially arc-shaped portions formed by the corner cutting edges 4 is set to (D−d)/2 or more with respect to the diameter D and the web thickness "d" of the tool body 1, because the corner cutting edges 4 are enlarged and there is a tendency for the interval from the end cutting edges 2 and corner cutting edges 4 to the inner edges 2B and 4B to be reduced, the above described problem of there being a deterioration in the ability to discharge the chips is conspicuous.

Moreover, in the corner portions 6 in which the inner edges 2B and 4B intersect with each other, the chips easily become caught up and the presence of the corner portions 6 causes a further deterioration in the ability to discharge the chips.

DISCLOSURE OF INVENTION

The present invention was conceived from this background and it is an object thereof to provide a radius end mill that enables a high degree of sharpness to be imparted to a protruding arc-shaped corner cutting edge that has a corner R provided on an outer circumferential side thereof, while enabling sufficient edge tip strength to be secured on the inner circumferential side of an end cutting edge, and that also achieves an improvement in the ability to dispose of chips produced by this corner cutting edge.

In order to achieve these objects, in the present invention, chip discharge flutes that are helically twisted are formed on an outer circumference of a distal end portion of a tool body that is rotated around an axis, main gash faces whose angle of inclination with respect to the axis is a smaller angle than a twist angle of the chip discharge flutes are formed on inner circumferential sides of distal end portions of wall surfaces of the chip discharge flutes that face in the direction of rotation of the tool; and the end cutting edges are formed on a distal end of the main gash faces, and sub gash faces whose angle of inclination with respect to the axis has been made greater than that of the main gash faces are formed on an outer circumferential side of the main gash faces such that they extend away via step portions from the main gash faces. In addition, the corner cutting edges that have a protruding arc-shaped contour are formed so as to be continuous with an outer circumferential side of the end cutting edges from a distal end as far as an outer circumference of the sub gash faces.

Accordingly, in a radius end mill that is structured in this manner, because main gash faces that are inclined with respect to the axis at a smaller angle than the twist angle of the chip discharge flutes are formed on inner circumferential sides of distal end portions of the chip discharge flutes, and because end cutting edges are formed on the distal ends thereof, the included angle of the end cutting edges may be increased, and it is possible to secure a cutting edge strength that is sufficient to withstand a large cutting load such as that described above. In addition to this, because sub gash faces whose angle of inclination with respect to the axis has been made greater than that of the main gash faces are formed on an outer circumferential side of the main gash faces and protruding arc-shaped corner cutting edges are formed on outer circumferential portions of the distal end of the sub gash faces, the rake angle in the axial direction of these corner cutting edges may be made larger than that of the end cutting edges, so that they are provided with excellent sharpness. Moreover, because the sub gash faces that are continuous with the corner cutting edges and form the rake faces thereof are made to extend away via step portions from the main gash faces that form the rake faces of the end cutting edges, and because, as a result of this, the chips that are produced by the corner cutting edges may be made to collide against these step portions, resistance may be imparted to the chips before they are discharged in an elongated shape, so as to curl or break them, thereby improving the ability to dispose of the chips.

However, if the step portions between the main gash faces and the sub gash faces are formed, for example, so as to be perpendicular to the sub gash faces, then the chips that are produced by the corner cutting edges as is described above create blockages when they collide against these step portions, so that the chip discharge performance is deteriorated and, conversely, there is a possibility that the smooth disposal of the chips will be obstructed. Therefore, it is desirable that the step portions be formed as inclined surfaces that move gradually away as they move from the main gash face side towards the sub gash face side.

Moreover, it is desirable that an angle of inclination of the inclined surfaces formed by the step portions in this case be within a range of 30° to 60° with respect to a direction that is perpendicular to the sub gash faces. If this angle of inclination is less than 30° and the rise in the step portions is a steep gradient, then there is a possibility that it will not be possible to sufficiently prevent the aforementioned blockages of chips from occurring. If, on the other hand, the inclination is a gentle slope that exceeds 60°, then the possibility arises that it will not be possible to impart sufficient resistance to collided chips and achieve reliable disposal.

Furthermore, when the step portions are formed as inclined surfaces in this manner, these inclined surfaces may be planar surfaces that have a constant angle of inclination, however, if the inclined surfaces are formed as concave curved surfaces, it becomes easier to curl the collided chips and more reliable chip disposal may be achieved.

A further object of the present invention is to provide a radius end mill that enables chips to be disposed of in an excellent manner.

In order to achieve this object, in the present invention, in a radius end mill in which end cutting edges and substantially arc-shaped corner cutting edges are formed on a tool body that is rotated around an axis, inner edges of rake faces of the end cutting edges and inner edges of rake faces of the corner cutting edges are formed as a single, smoothly continuous convex curve.

In the present invention that is constructed in this manner, because inner edges of rake faces of the end cutting edges and inner edges of rake faces of the corner cutting edges are formed as a single, smoothly continuous convex curve, and because, unlike the conventional structure, there are no corner portions produced by the inner edges intersecting each other formed on these rake faces, it is possible to increase the spacings between the end cutting edges and the corner cutting edges and the inner edges of the rake faces thereof by the amount obtained by obviating these corner portions. Namely, by securing a large enough space for discharging chips, it is possible to maintain an excellent chip disposal performance.

Furthermore, in the same manner, because the inner edges of the rake faces of the end cutting edges and corner cutting edges together form a single continuous convex curve, when produced chips are discharged, it is difficult for these chips to become caught, and the chips may be discharged smoothly. Because of this as well, it is possible to maintain an excellent chip discharge performance.

It is also preferable that a rake face of an end cutting edge and a rake face of a corner cutting edge are formed as a single, smoothly continuous curved surface. By forming a rake face of an end cutting edge and a rake face of a corner cutting edge as a single, smoothly continuous curved surface, produced chips are able to pass smoothly over these rakes faces, resulting in a further improvement in the chip discharge performance being achieved.

The present invention enables a considerable effect to be expected in cases such as when a ratio r/D between a radius of curvature "r" of the substantially arc shapes formed by the corner cutting edges and the diameter D of the tool body is set to 0.2 or more, or when the radius of curvature "r" of the substantially arc-shaped portions formed by the corner cutting edges is set to (D−d)/2 for the diameter D and the core thickness "d" of the tool body, namely, in cases when the corner cutting edges are large and it is necessary to have a small spacing between the corner cutting edges and end cutting edges and the inner edges of the rake faces of these edges.

BRIEF DESCRIPTION DRAWINGS

FIG. 13 is a plan view, FIG. 14 is a side view, and FIG. 15 is a front view.

Figure 10:
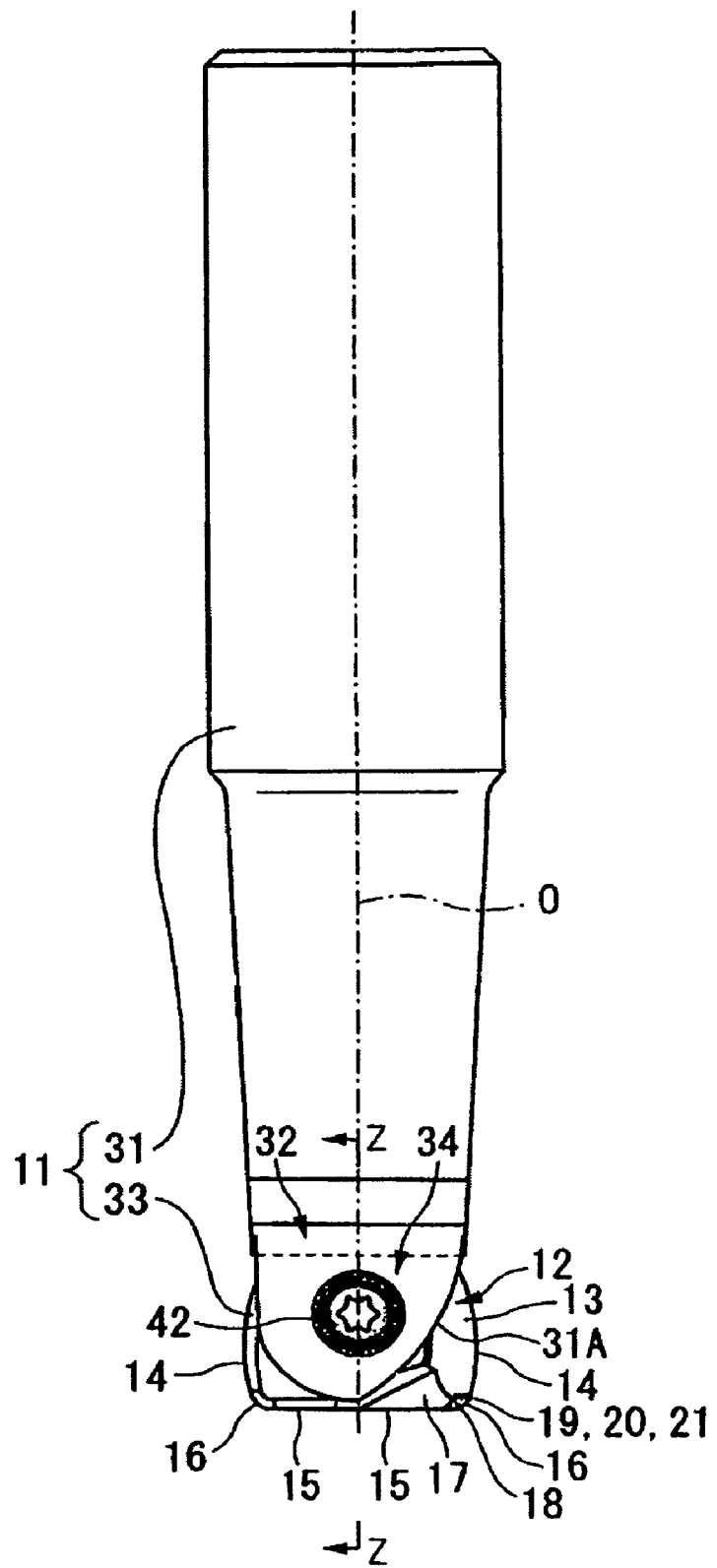
FIG. 10 is a plan view showing a fourth embodiment of the present invention.
Figure 11:
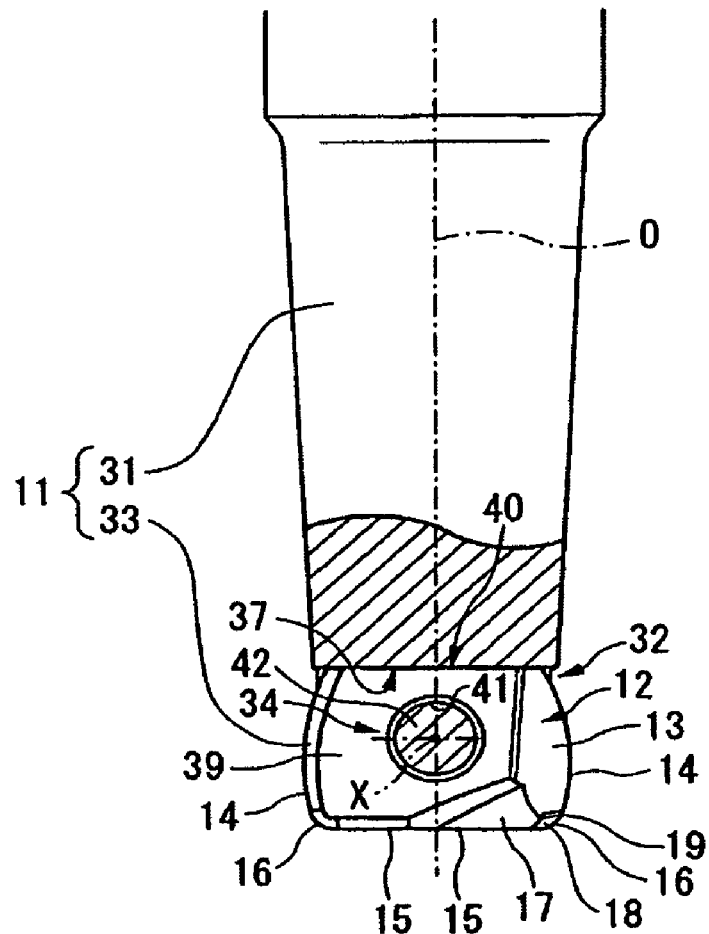
FIG. 11 is a cross-sectional view of a distal end portion (i.e., a cross-sectional view taken along the line Y-Y in FIG. 12) of a tool body 11 of the embodiment shown in FIG. 10.
Figure 12:
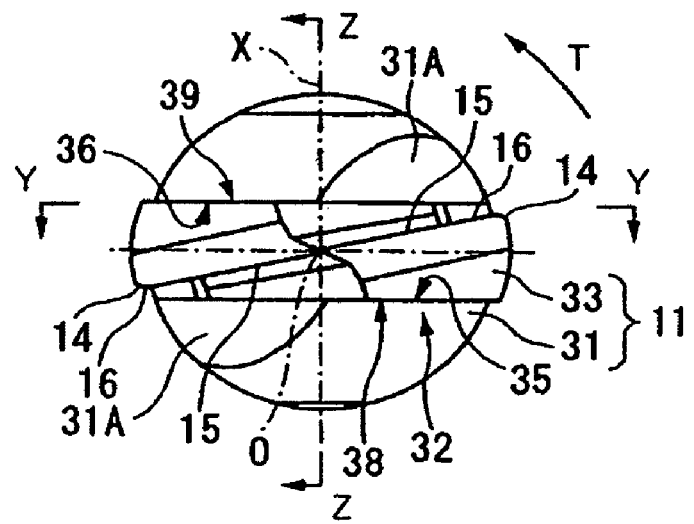
FIG. 12 is a front view as seen from the distal end in a direction of an axis O of the embodiment shown in FIG. 10.
Figure 13:
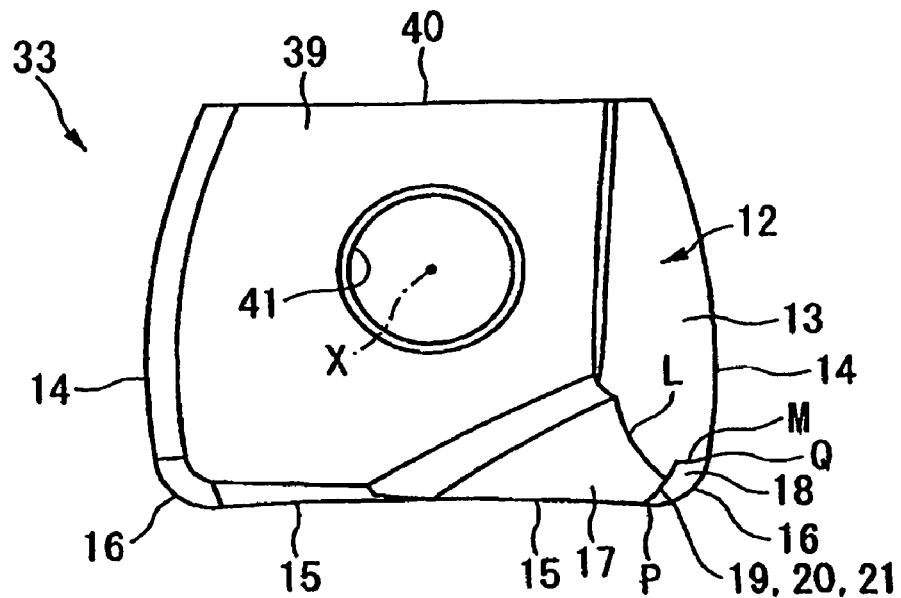
FIG. 13 to FIG. 15 show an indexable insert 33 that is mounted on the embodiment shown in FIG. 10.
Figure 14:
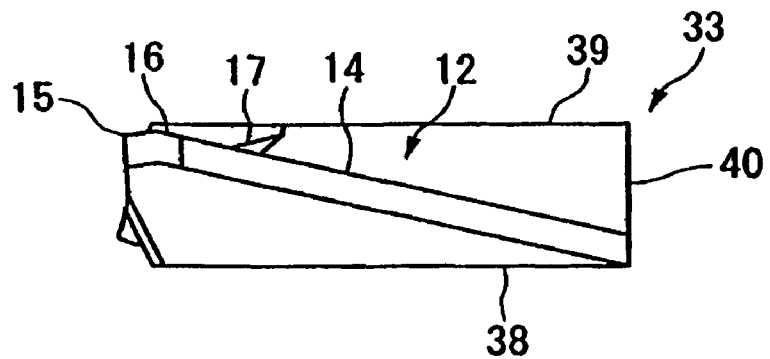
Figure 15:
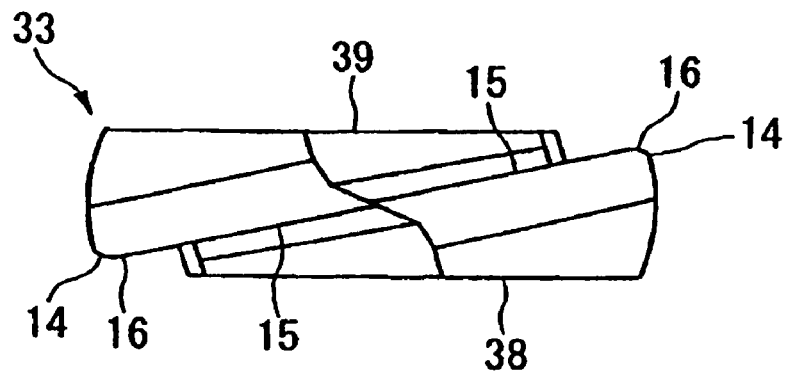
Figure 16:
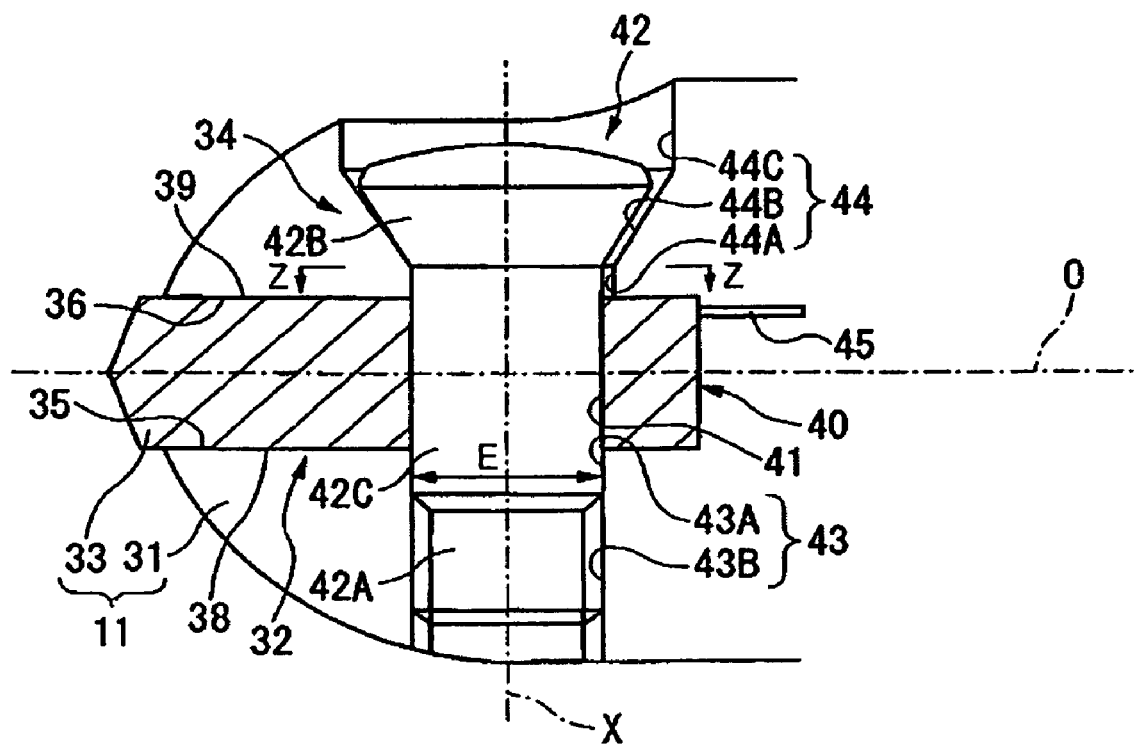
Figure 17:
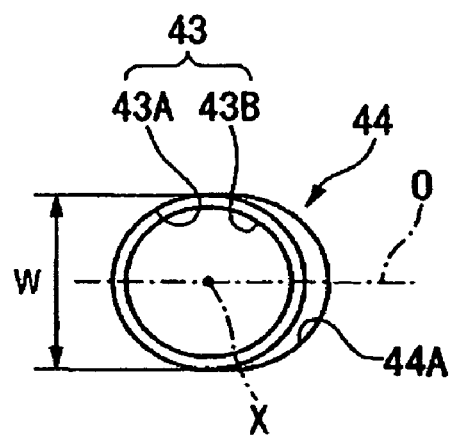
Figure 25:
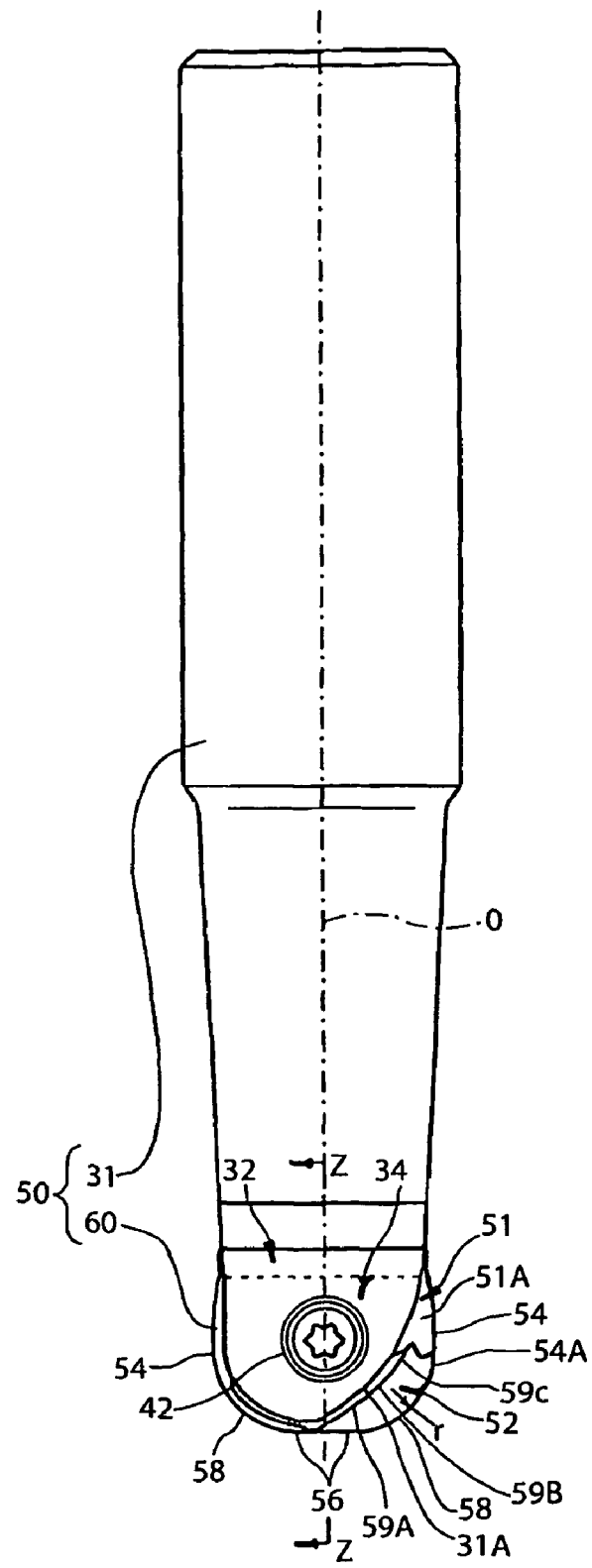

FIG. 16 and FIG. 17 show a clamp mechanism 34 of the embodiments shown in FIGS. 10 and 25, and FIG. 16 is a cross-sectional view taken along the line Z-Z in FIGS. 10, 12, 25, and 27, and FIG. 17 is a cross-sectional view taken along the line Z-Z in FIG. 16 (the indexable insert 33 and clamp screw 42 are omitted from the drawings).

Figure 18:
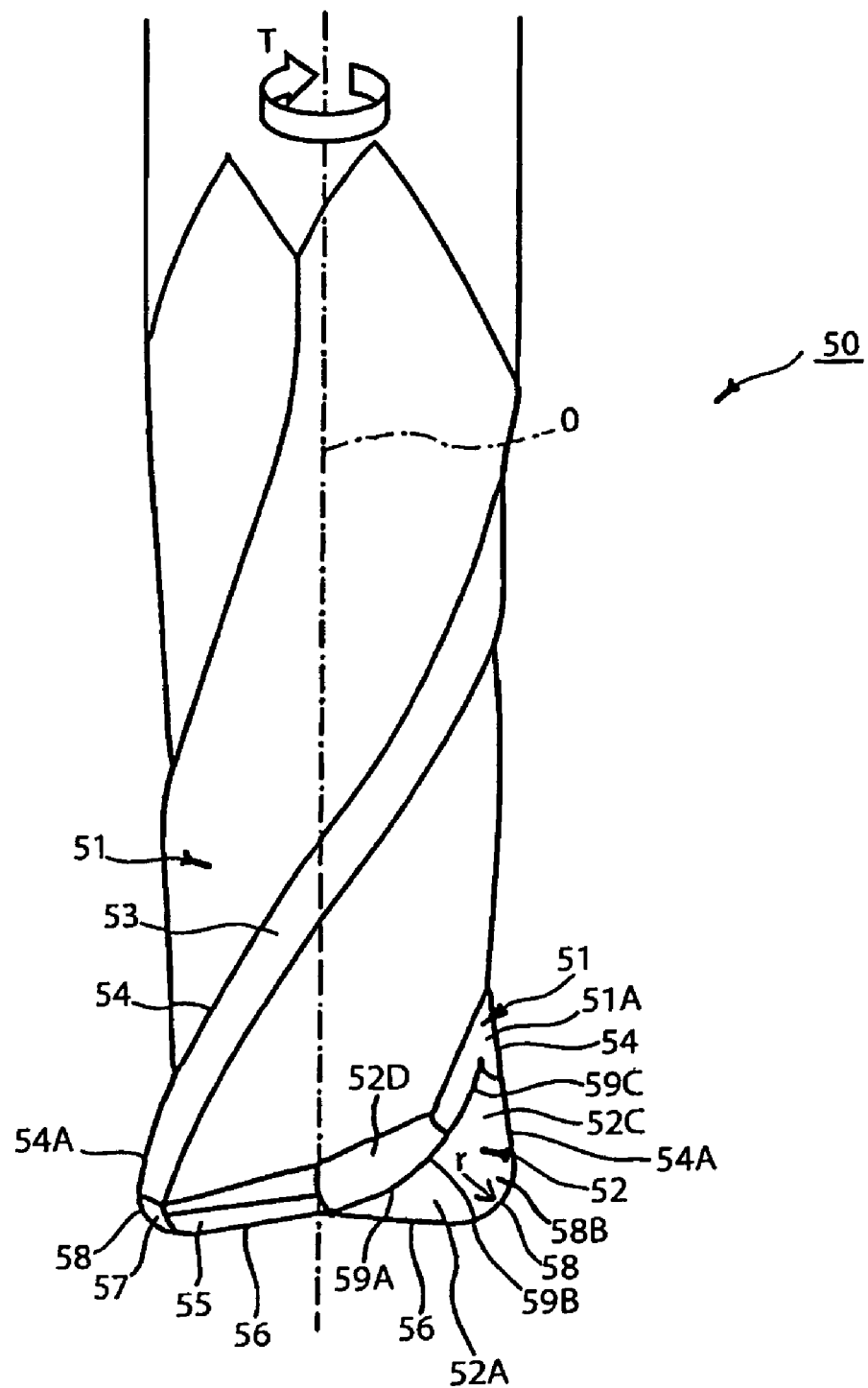
Figure 19:
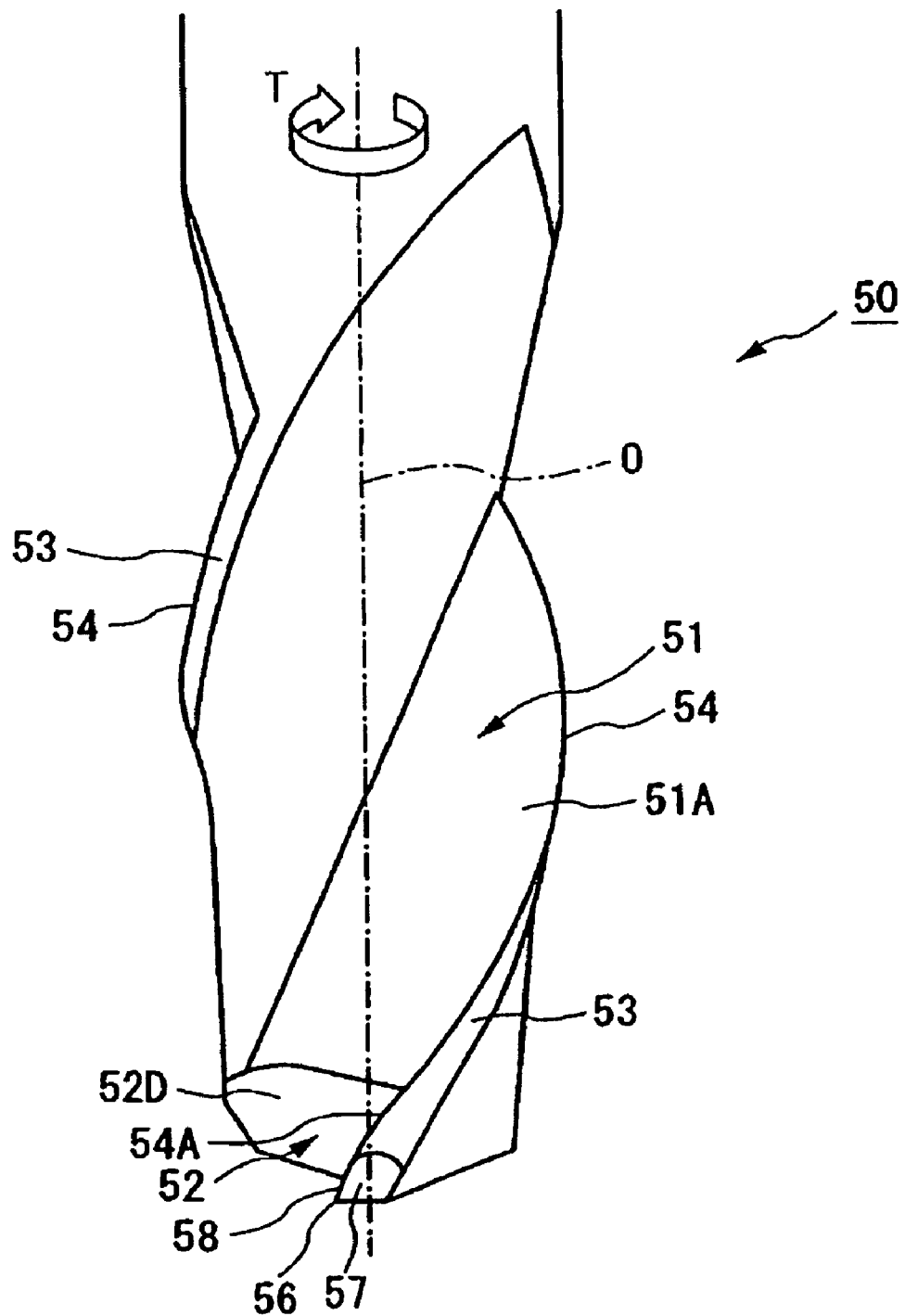
Figure 20:
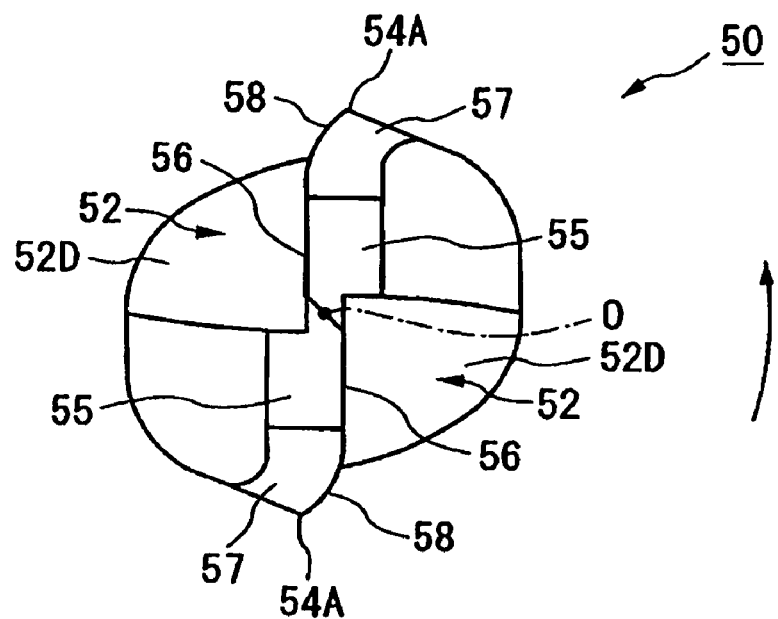
Figure 21:
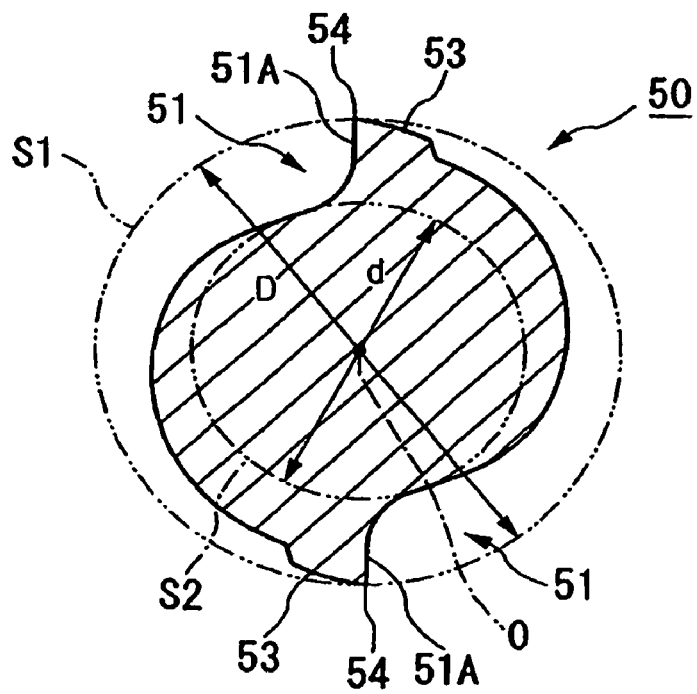

FIG. 18 is a plan view of a radius end mill according to a fifth embodiment of the present invention, FIG. 19 is a side view of a radius end mill according to the fifth embodiment of the present invention, FIG. 20 is a view of a distal end surface of a radius end mill according to the fifth embodiment of the present invention, and FIG. 21 is a cross-sectional view of a tool body 50 of a radius end mill according to the fifth embodiment of the present invention.

Figure 22:
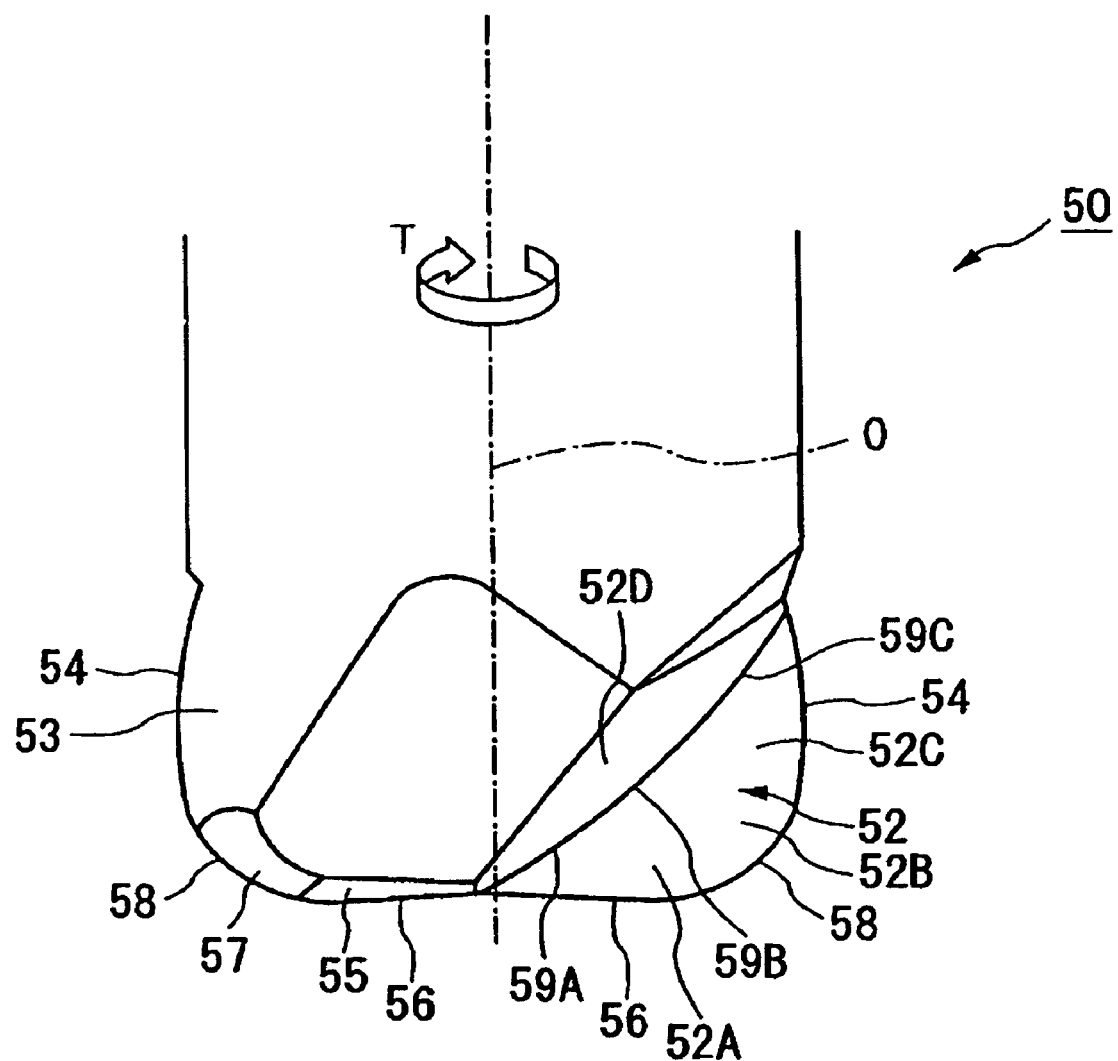
Figure 23:
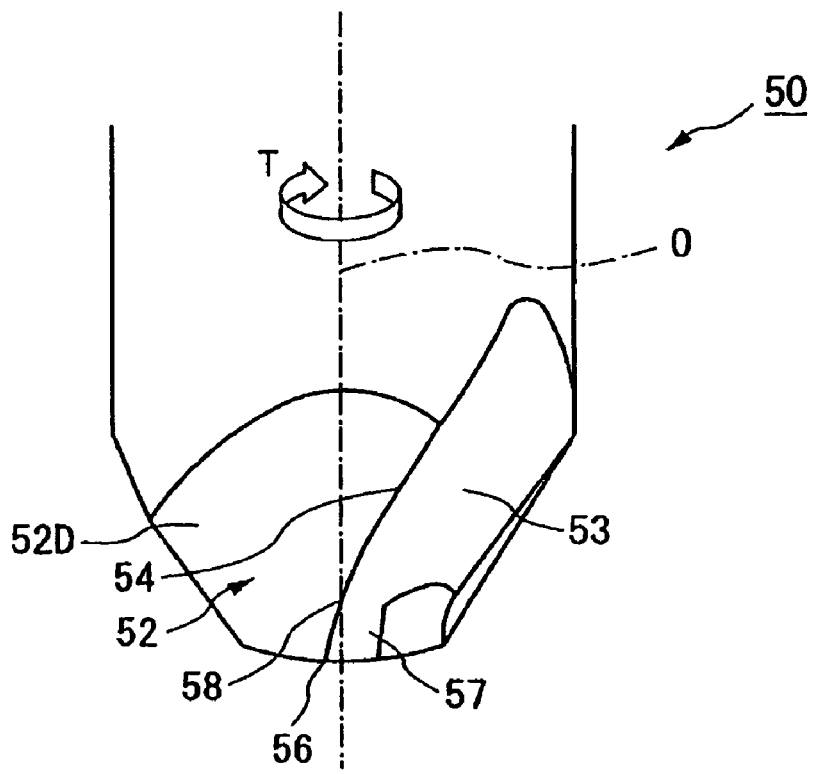
Figure 24:
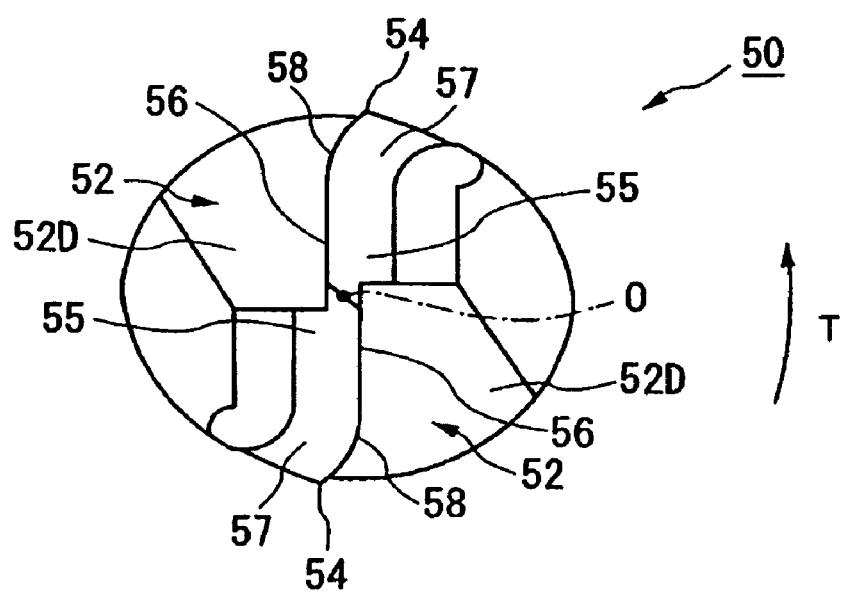

FIG. 22 is a plan view of a radius end mill according to a sixth embodiment of the present invention, FIG. 23 is a side view of a radius end mill according to the sixth embodiment of the present invention, and FIG. 24 is a view of a distal end surface of a radius end mill according to the sixth embodiment of the present invention.

Figure 26:
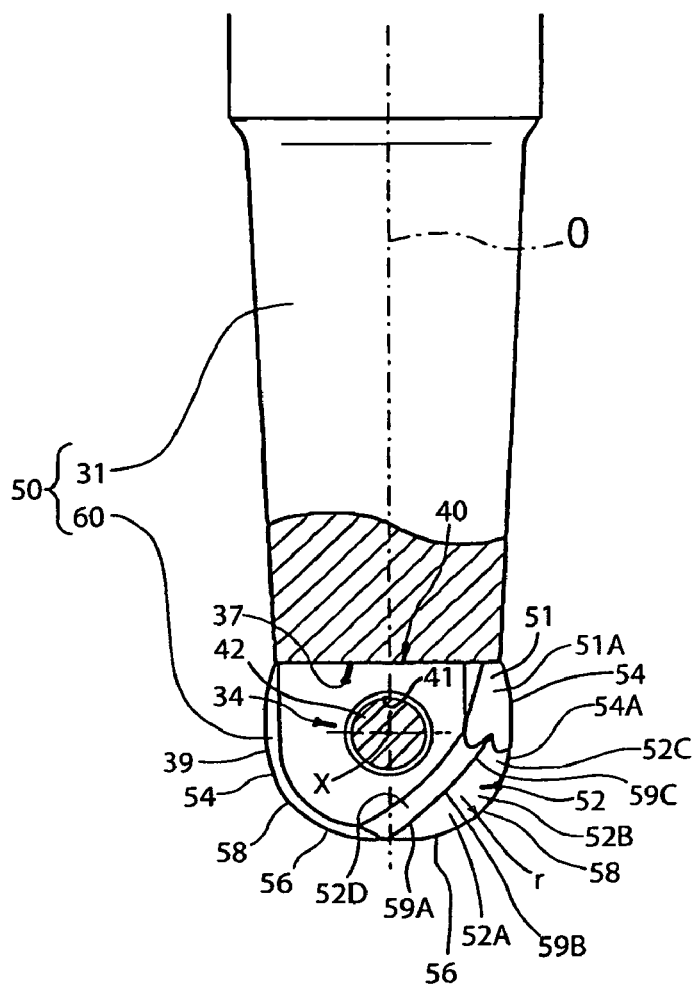
Figure 27:
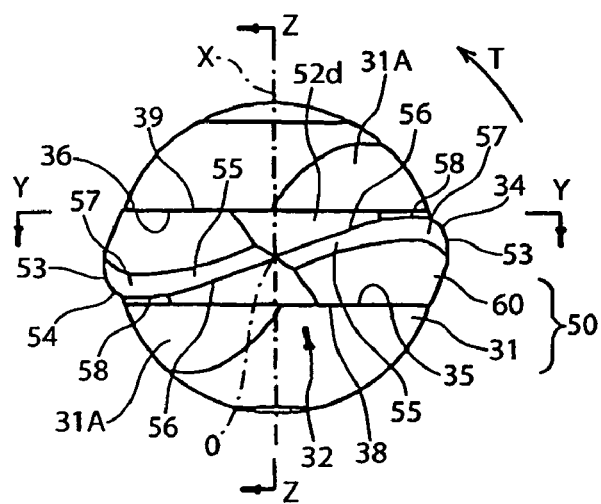

FIG. 25 is a plan view showing a seventh embodiment of the present invention,

FIG. 26 is a cross-sectional view of a distal end portion (i.e., a cross-sectional view taken along the line Y-Y in FIG. 27) of the tool body 11 of the embodiment shown in FIG. 25, FIG. 27 is a front view as seen from the distal end in the direction of the axis O of the embodiment shown in FIG. 25.

Figure 28:
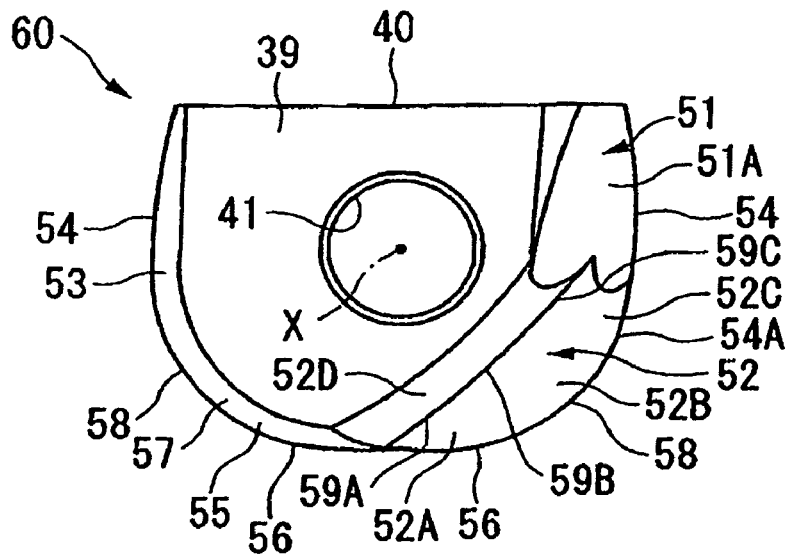
Figure 29:
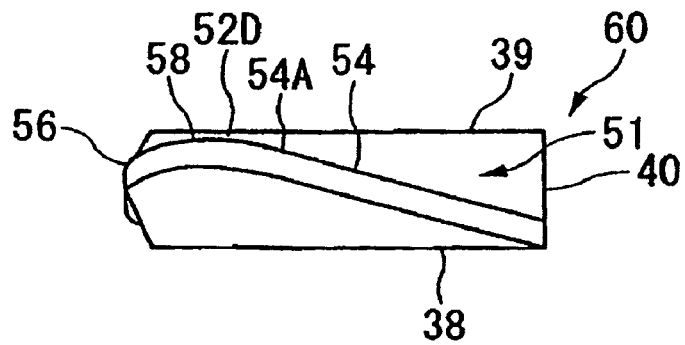
Figure 30:
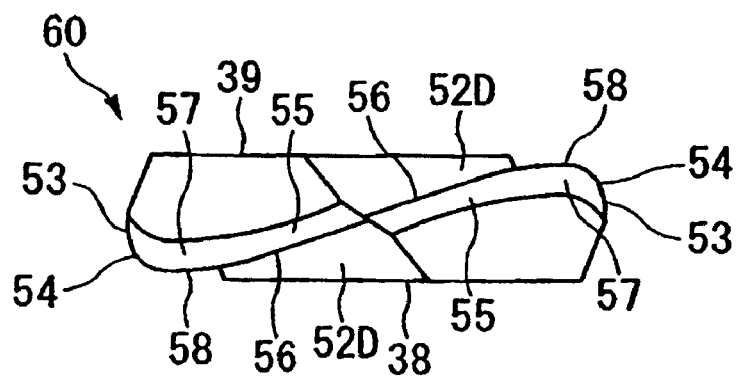

FIG. 28 to FIG. 30 show an indexable insert 60 that is mounted on the embodiment shown in FIG. 25, FIG. 28 is a plan view, FIG. 29 is a side view, and FIG. 30 is a front view.

Figure 31:
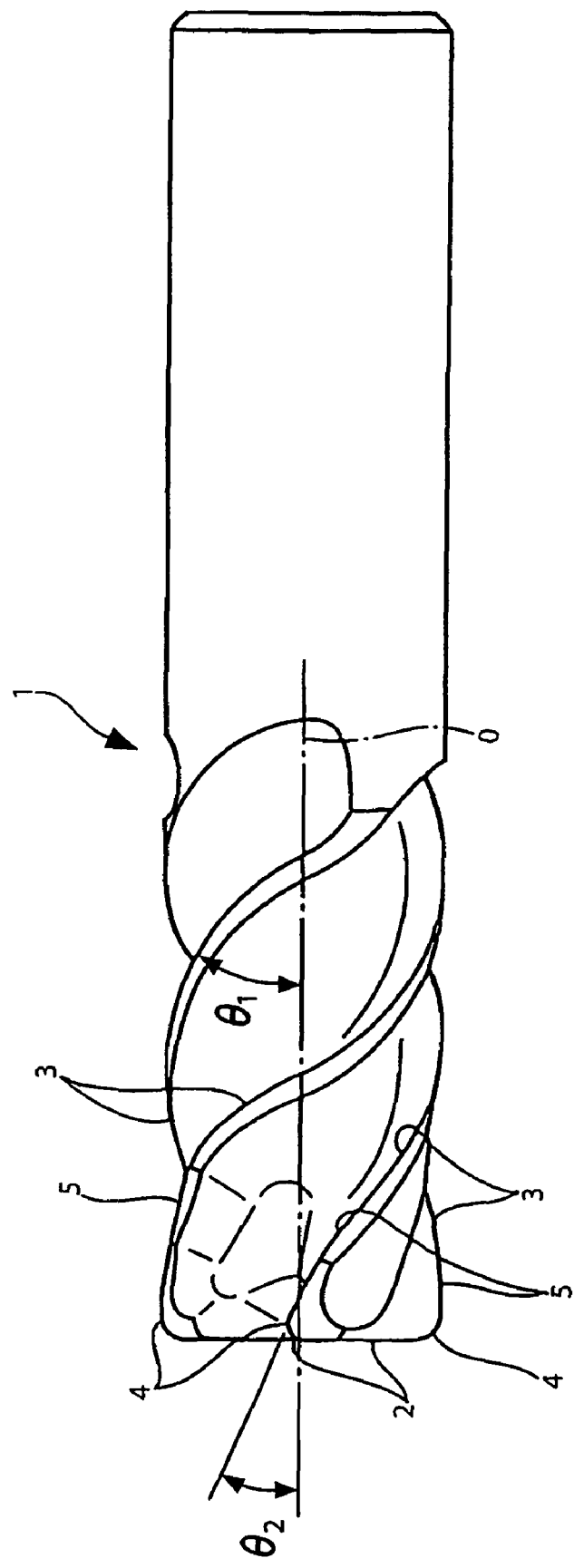
Figure 32:
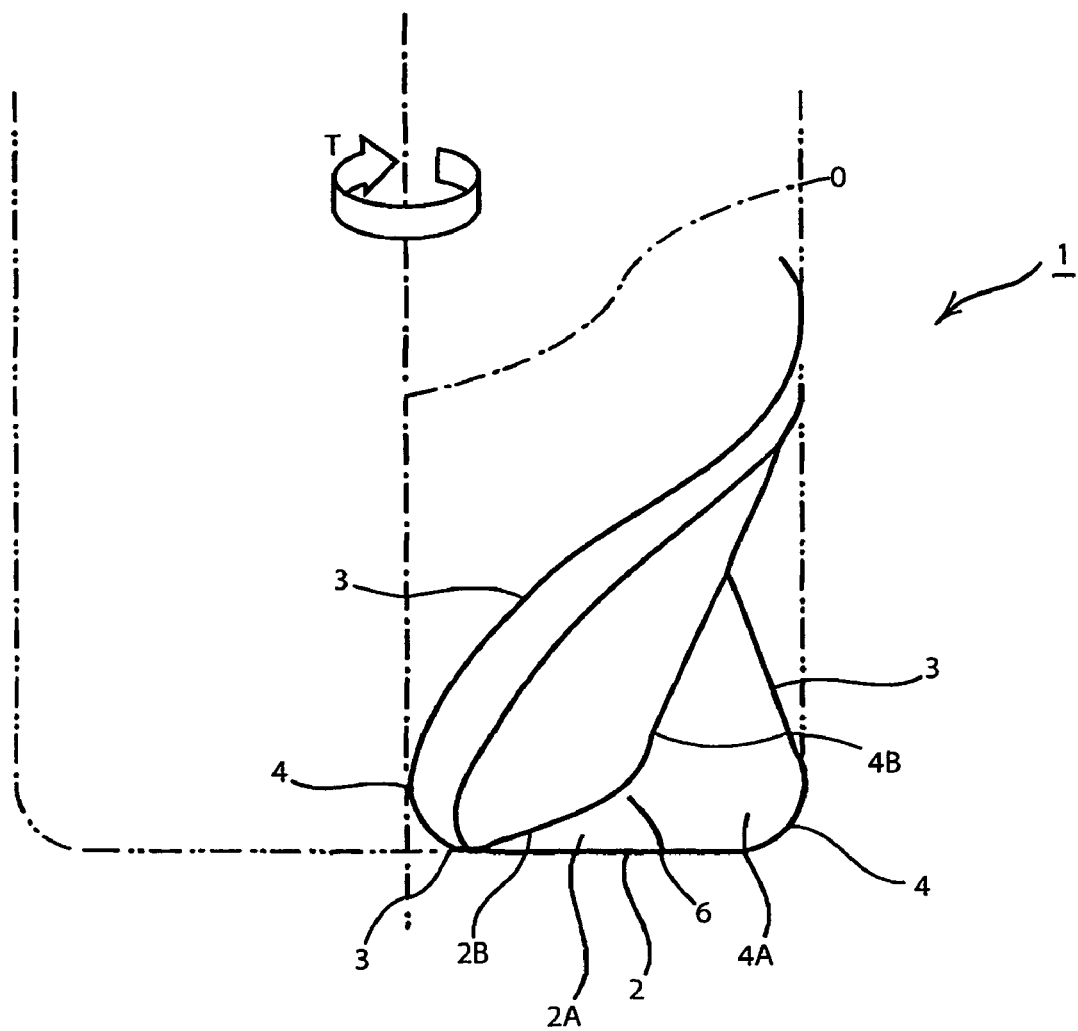

FIG. 31 is a plan view of a conventional radius end mill,

FIG. 32 is an enlarged view of principal portions of the conventional radius end mill shown in FIG. 31.

BEST MODE FOR CARRYING OUT THE INVENTION

Preferred embodiments of the present invention will now be described with reference made to the drawings. It should be understood, however, that the present invention is not limited to these embodiments and, for example, various combinations of component elements of the embodiments may be made as is appropriate.

Firstly, FIGS. 1 through 17 show first through fourth embodiments of the present invention that relate to a radius end mill in which a main gash face having an end cutting edge is formed on an inner peripheral side of a distal end portion of a wall surface of a chip discharge flute of a tool body, and in which sub gash faces are formed via a step portion on an outer peripheral surface of the main gash face, and corner cutting edges are formed extending from the distal end of the sub gash faces to an outer circumference.

Of these, in the first embodiment of the present invention which is shown in FIGS. 1 through 4, a tool body 11 is formed from a hard material such as cemented carbide having a circular column-shaped external configuration that is centered on an axis O. Note that the tool body 11 is formed so as to have a rotationally symmetric configuration around the axis O.

A pair of chip discharge flutes 12 are formed on an outer circumference of a distal end portion (i.e., the end portion of the left side in FIGS. 1 and 2) of the tool body 11 such that, as they move from the distal end towards the rear end side, they are helically twisted at a constant twist angle α around the axis O towards the rear in the rotation direction T of the tool during a cutting operation.

Wall faces 13 of the chip discharge flutes 12 that face in the tool rotation direction T are formed at a cross-section that is orthogonal to the axis O as concave curved surfaces that are depressed towards the rear side of the tool rotation direction T. Peripheral cutting edges 14 are formed on side ridge portions on the outer circumferential side of the wall faces 13, while end cutting edges 15 are formed on the distal end side of the wall faces 13. Furthermore, corner cutting edges 16 having an arc-shaped external configuration that protrude towards the outer circumferential side at the distal end are formed so as to be connected to the peripheral cutting edges 14 and the end cutting edges 15 on corner portions on the outer circumferential side of the distal end of the wall faces 13 where the peripheral cutting edges 14 and end cutting edges 15 intersect.

Here, in the present embodiment, gashes are formed in two stages on inner and outer circumferences of the distal end portion of the wall faces 13 that face towards the tool rotation direction T of the chip discharge flutes 12. Of these, a main gash face 17 is formed by the first stage gash on an inner circumferential side of the wall face 13, and the end cutting edge 15 is formed on a distal end edge of the main gash face 17.

Figure 3:
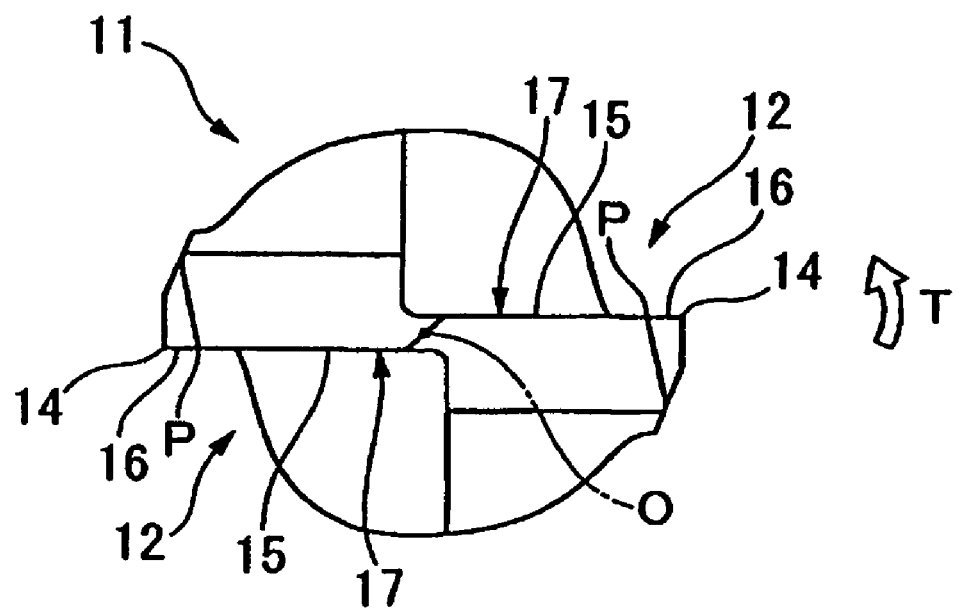
FIG. 3 is a front view as seen from the distal end in a direction of an axis O of the embodiment shown in FIG. 1.

The main gash faces 17 are formed in a planar shape by cutting out the inner circumferential side of the distal end portion of the wall face 13 in a direction that is substantially parallel to the axis O. Accordingly, the angle of inclination of the main gash faces 17 with respect to the axis O is set to 0°, and is set as smaller than the twist angle α of the chip discharge groves 12. As is shown in FIG. 3, the end cutting edges 15 are formed so as to extend rectilinearly towards the outer circumferential side from the inner circumference of the tool body 11 as seen from the distal end in the axial direction O, and are provided with a rake angle of 0° in the axial direction that is the same as the aforementioned angle of inclination.

Figure 1:
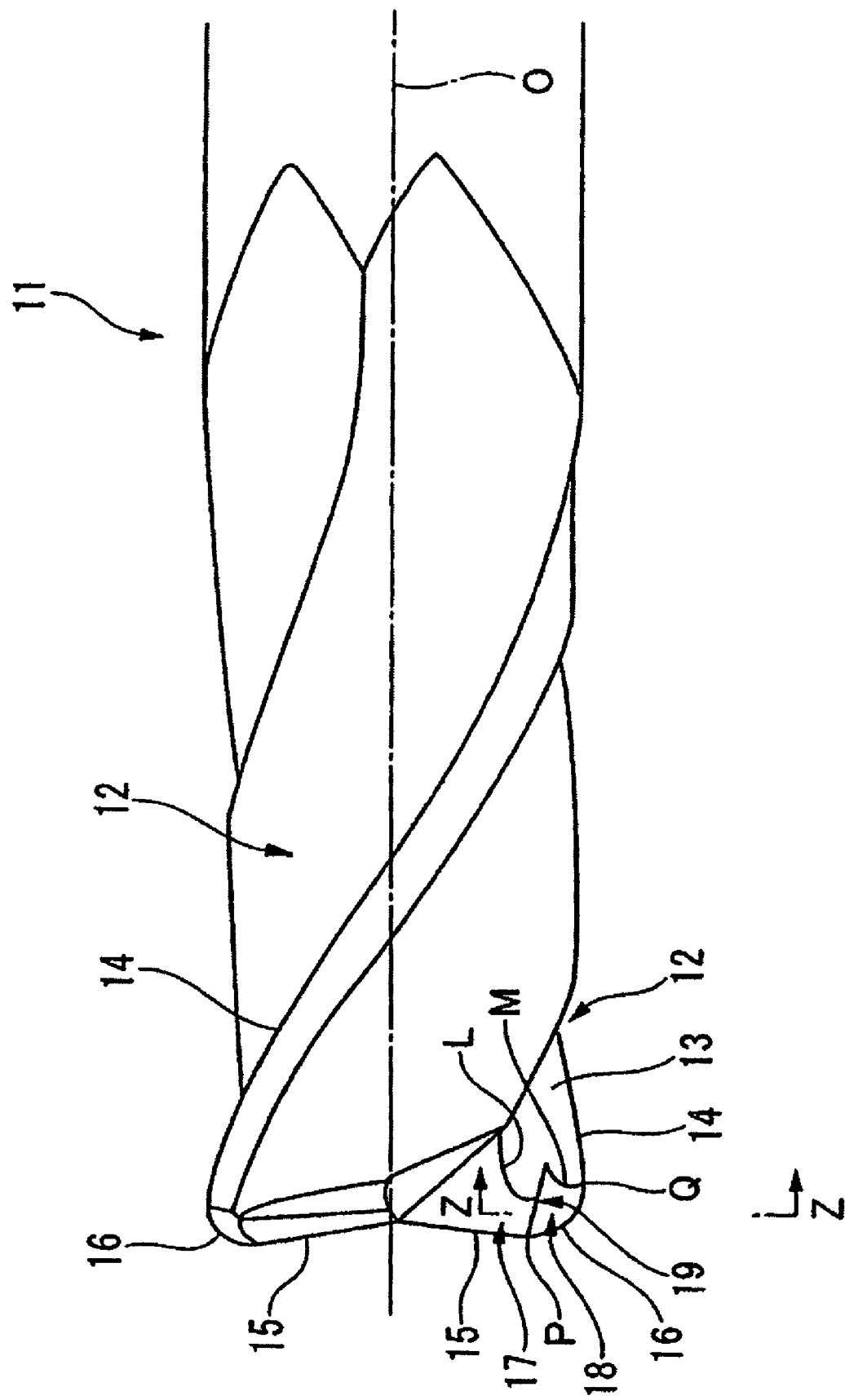
FIG. 1 is a plan view of a distal end portion of a tool body 11 showing a first embodiment of the present invention.
Figure 2:
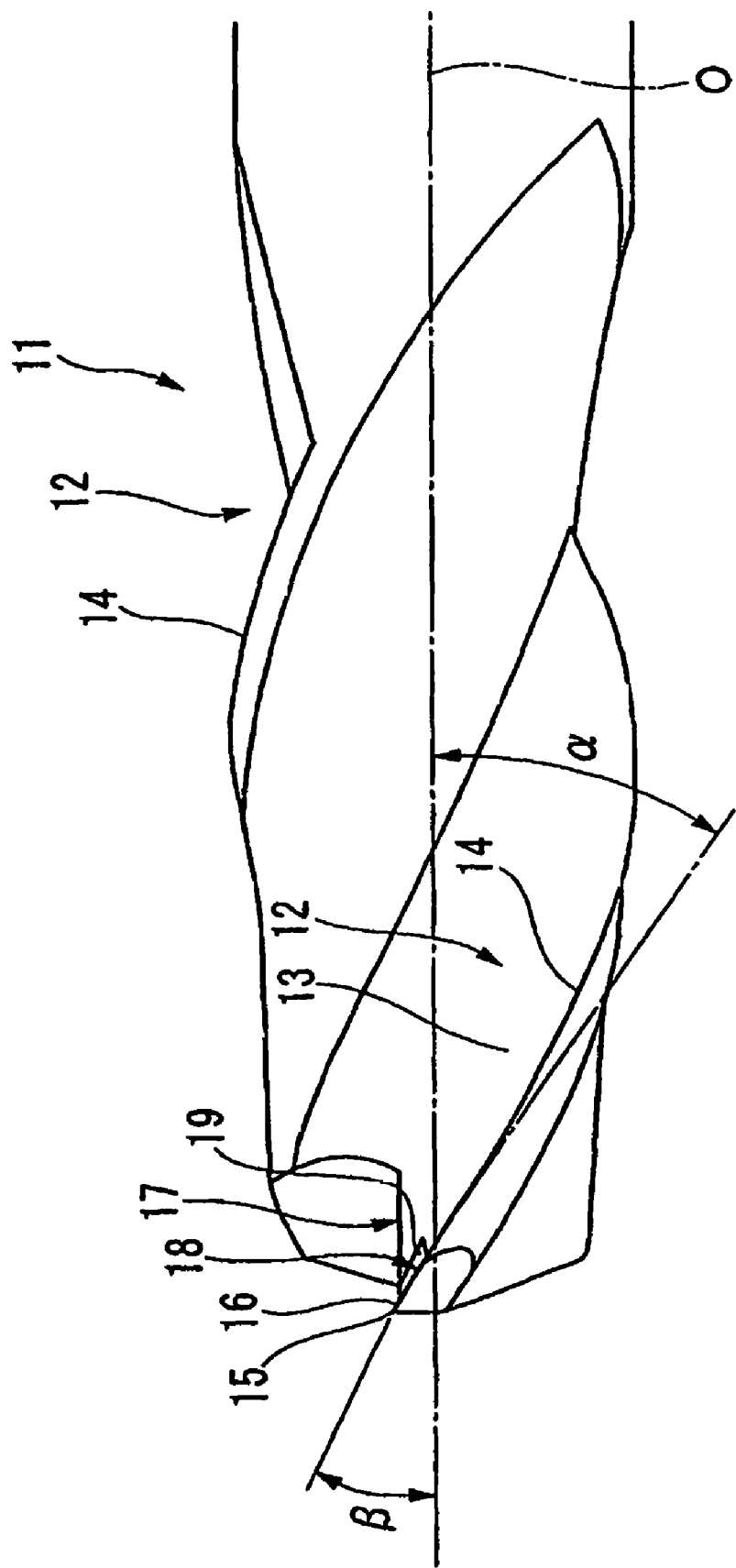
FIG. 2 is a side view of the embodiment shown in FIG. 1.

However, in the present embodiment, as seen in plan view facing the main gash faces 17, the end cutting edges 15 are slightly inclined so as to approach the distal end side as they move towards the outer circumferential side, as shown in FIG. 1, thereby resulting in the end cutting edges 15 being provided with a concave angle.

On the outer circumferential side of the distal end portion of the wall face 13, sub gash faces 18 are formed on an inner side of the aforementioned corner portion by the second stage gash so as to be adjacent to the outer circumferential side of the main gash face 17. The corner cutting edges 16 are formed on side ridge portions on the outer circumferential side of the distal ends of the sub gash faces 18.

The sub gash faces 18 are formed in the same manner as the main gash faces 17 by cutting the outer circumferential side of distal end portions of the wall faces 13 in a planar shape. However, while the main gash faces 17 extend substantially in parallel to the axis O, as is described above, at points of intersection P between the end cutting edges 15 and the corner cutting edges 16, the sub gash faces 18 intersect with the main gash faces 17 and are slanted so as to gradually extend away towards the rear side of the tool rotation direction T with respect to the main gash faces 17 as they approach the rear end side in the direction of the axis O. Accordingly, an angle of inclination β of each sub gash face 18 with respect to the axis O is made larger on the positive angle side than the angle of inclination with respect to the axis O of the main gash faces 17 which is 0°.

Figure 4:
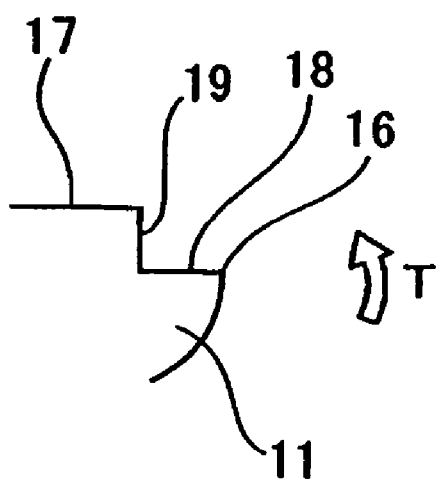
FIG. 4 is a cross-sectional view taken along the line Z-Z in FIG. 1.

Moreover, by forming the sub gash faces 18 such that they extend away from the main gash faces 17, the sub gash faces 18 are made adjacent to the main gash faces 17 via a step portion 19. In the present embodiment, at a cross-section that is orthogonal to the axis O, as shown in FIG. 4, these step portions 19 are formed as planar wall surfaces that are perpendicular to the main gash faces 17. In addition, they are also perpendicular to the sub gash faces 18. Furthermore, as shown in FIG. 1, at the aforementioned point of intersection P, the step portions 19 are made to intersect with the end cutting edges 15 and corner cutting edges 16, so that they extend substantially perpendicularly with respect to the end cutting edges 15 that have been provided with the aforementioned concave angle.

Moreover, the angle of inclination β of the sub gash faces 18 with respect to the axis O is made smaller than the twist angle α of the chip discharge flutes 12 with respect to the axis O. Accordingly, as shown in FIG. 1, at rear ends of these sub gash faces 18, outer circumferential ends of an intersection edge line L where the main gash faces 17 intersect with the wall faces 13 are made to intersect with the wall faces 13 at the point where they pass the rear end side, and an outer circumferential end of an intersection edge line M thereof is taken as an intersection point Q between the peripheral cutting edges 14 and the corner cutting edges 16. However, if the sub gash face 18 is small, this type of structure does not need to be employed.

Note that because the wall faces 13 are formed as the above described concave curved surfaces, in the above described plan view, the intersection edge lines L and M are formed as convex curved lines that protrude towards the distal end side, as shown in FIG. 1.

Moreover, while the corner cutting edges 16 make smooth contact at the intersection points P with the end cutting edges 15 that are formed as straight lines, as they approach the outer circumferential side at the rear end along the protruding arcs formed by the corner cutting edges 16 from the intersection points P, they are inclined so as to approach the rear end side of the rotation direction T to match the angle of inclination β of the sub gash faces 18, and intersect with the peripheral cutting edges 14 at the intersection point Q.

Accordingly, in a radius end mill that is constructed in this manner, firstly, the main gash faces 17, which form an angle of inclination that is smaller (i.e., 0°) with respect to the axis O than the twist angle α of the chip discharge flutes 12, are formed on an inner circumferential side of the distal end portion of the wall faces 13 that face in the tool rotation direction T of the chip discharge flutes 12, and the end cutting edges 15 are subsequently formed on the distal ends of these main gash faces 17. Accordingly, compared with when the wall faces 13 are simply extended as they are towards the distal end side so as to form end cutting edges, the included angle of the end cutting edges 15 may be increased. As a result, in the end cutting edges 15 in which, on the inner circumferential side of the tool body 11, the cutting speed is slow and a considerable cutting load is applied, a sufficient edge tip strength may be secured, and it is possible to lengthen the lifespan of the tool by preventing chipping or defects from occurring in the cutting edge.

On the other hand, because the sub gash faces 18, which are inclined towards the rear in the tool rotation direction T as they approach the rear end side at the angle of inclination β with respect to the axis O that is larger than that of the main gash faces 17, are formed in a distal end portion of the wall faces 13 on the outer circumferential side of the main gash faces 17, and because the substantially protruding arc-shaped corner cutting edges 16 that are continuous with the outer circumferential sides of the end cutting edges 15 are formed on side ridge portions of the outer circumferential sides of the distal ends of the sub gash faces 18, the corner cutting edges 16 may be provided with excellent sharpness, and a decrease in cutting resistance may be achieved. Accordingly, in particular, in a cutting operation to cut a slanted surface or curved surface of a mold in which the corner cutting edges 16 are frequently used, an improvement in the cutting efficiency may be achieved.

Moreover, in the present embodiment, although the angle of inclination β of the sub gash faces 18 is greater than that of the main gash faces 17, it is smaller than the twist angle α of the chip discharge flutes 12. Accordingly, compared with when the corner cutting edges are formed by simply extending the wall faces 13 as they are as far as the distal end of the tool body 11, a larger included angle may be secured in the corner cutting edges 16, and it is possible to prevent chipping or defects occurring in the corner cutting edges 16.

Moreover, as a result of the sub gash faces 18, whose angle of inclination β with respect to the axis O is different from that of the main gash faces 17, being formed at distal end portions of the wall faces 13 by making the end cutting edges 15 and corner cutting edges 16, which are formed at the distal end sides of the gash faces, smoothly continuous at the intersection points P, the sub gash faces 18 are made to extend away from the main gash faces 17, and the above described step portions 19, which are shaped as vertical wall surfaces standing upright from the sub gash faces 18, are formed between the sub gash faces 18 and the main gash faces 17. In addition, because the step portions 19 are formed so as to extend substantially perpendicularly from the intersection points P to the end cutting edges 15, namely, so as face the outer circumferential side of the tool body 11, chips that are produced in portions extending, in particular, from corner portion protruding ends to the outer circumferential sides of the corner cutting edges 16 during a cutting operation to cut an inclined surface or curved surface of a die or the like, may be made to slide along the top of the sub gash faces 18 and collide with the step portions 19.

As a result, even if the chips are discharged in elongated form, because they are subjected to resistance by when they collide against the step portions 19 and undergo processing such as being curled or broken, according to a radius end mill having the above described structure, an improvement in the processing ability of these chips may also be achieved, and together with a reduction in the cutting resistance of the corner cutting edges 16, it becomes possible to achieve a smoother die cutting operation and the like.

Note that, in the above described first embodiment, in a cross-section where the step portions 19 intersect the axis O, they are perpendicular to the main gash faces 17 and are also perpendicular to the sub gash faces 18. Accordingly, it is possible to provide greater resistance to the chips that have collided with the step portions 19 and a reliable processing thereof may be achieved. However, on the other hand, if the angle of the step portions 19, which form upright wall shapes in the manner described above, with respect to the sub gash faces 18 is a steep gradient, then, depending on the cutting conditions and the like, the chips that have been discharged onto the sub gash faces 18 in the manner described above may not only be subjected to resistance when they collide against the step portions 19, but the discharge itself may be obstructed and blockages produced. This may cause an interruption of a smooth chip discharge and, conversely, there is a possibility that the chip processing capability will be deteriorated.

Therefore, in cases such as this, as in the radius end mill of a second embodiment of the present invention shown in FIGS. 5 through 8, it is desirable that step portions 20 be formed as inclined surfaces that gradually extend away as they approach the sub gash face 18 side from the main gash face 17 side. Note that, in the second embodiment shown in FIGS. 5 through 8, portions that are the same as in the first embodiment shown in FIGS. 1 through 4 are given the same reference symbols and a description thereof is omitted.

Figure 5:
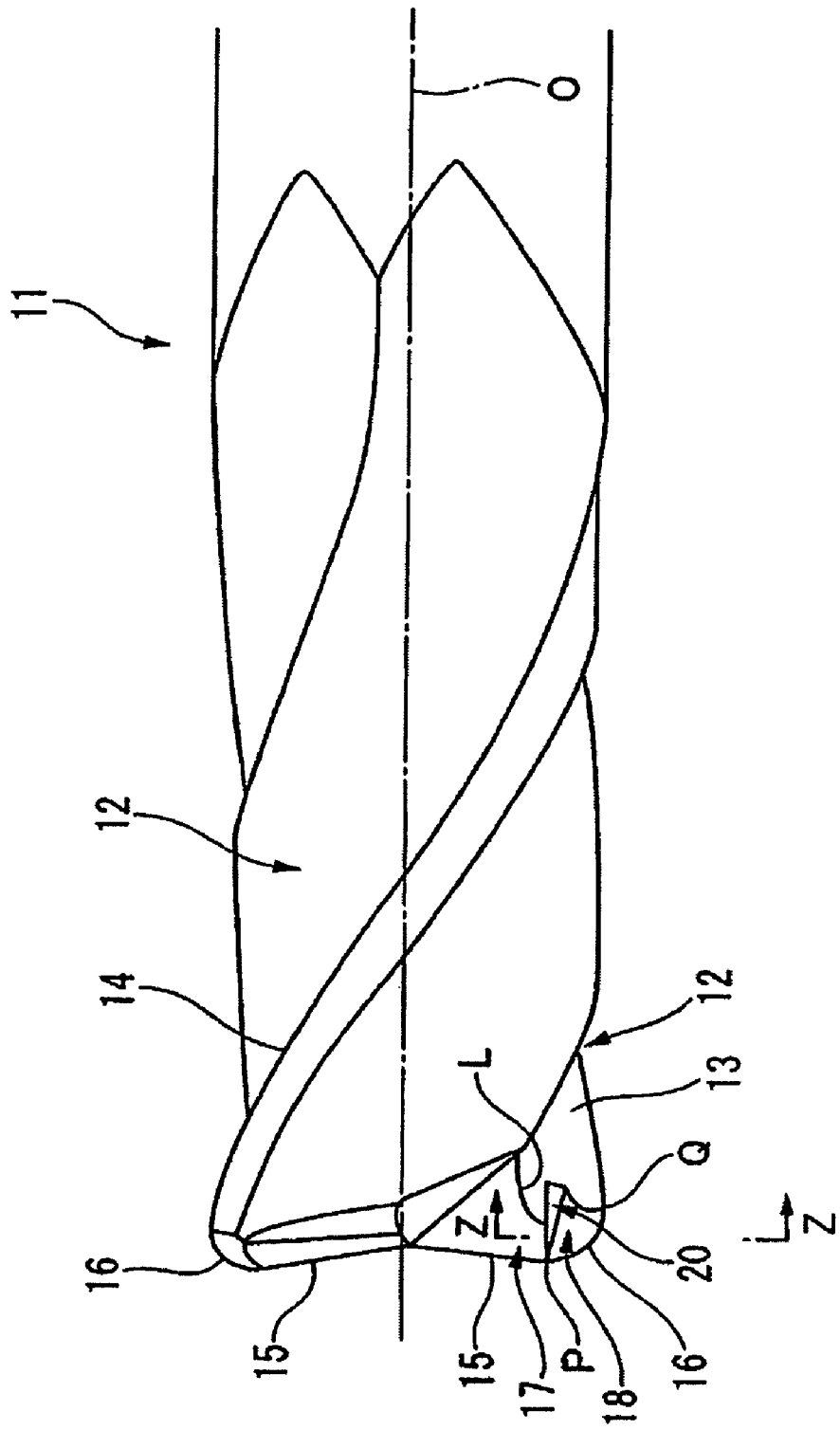
FIG. 5 is a plan view of a distal end portion of a tool body 11 showing a second embodiment of the present invention.
Figure 6:
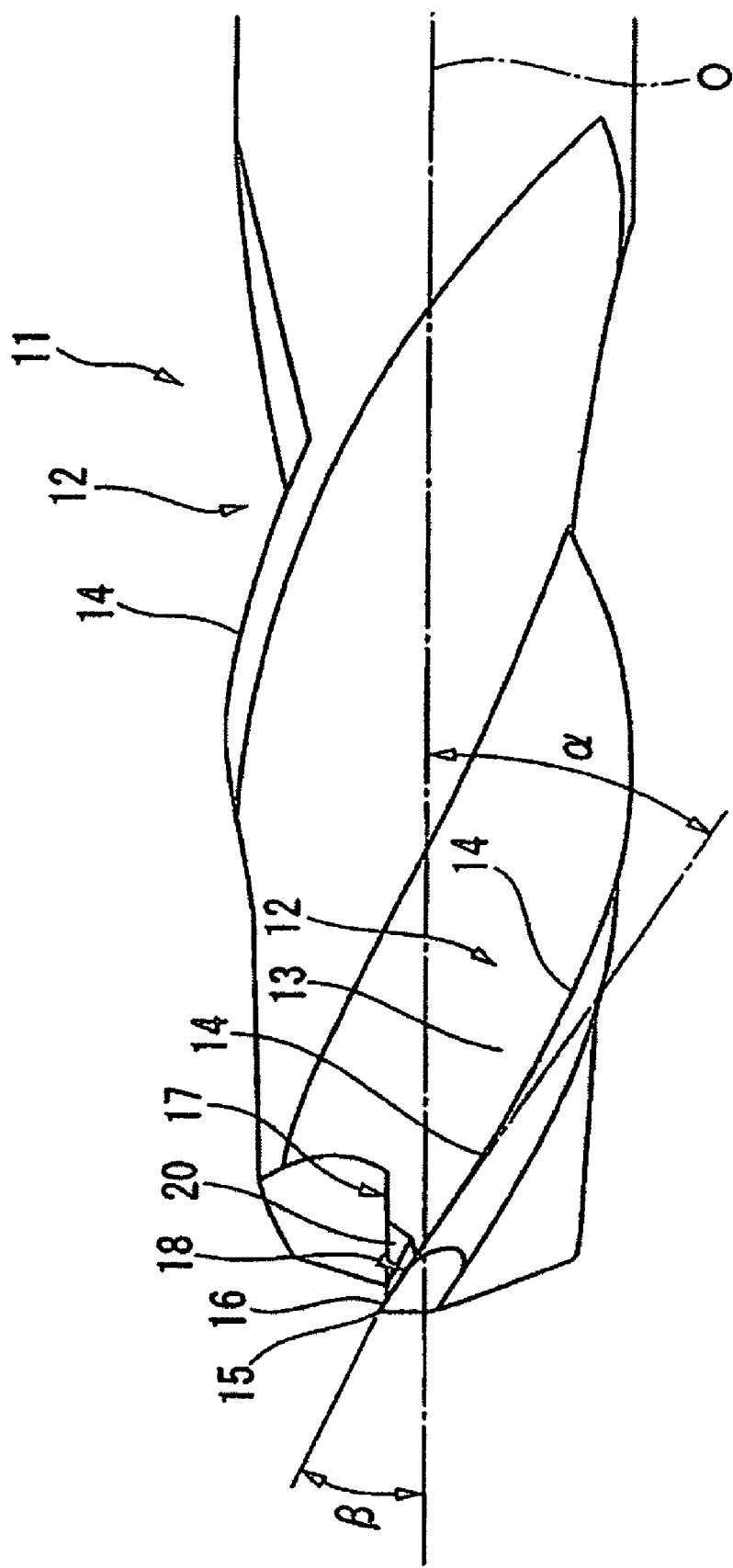
FIG. 6 is a side view of the embodiment shown in FIG. 5.
Figure 7:
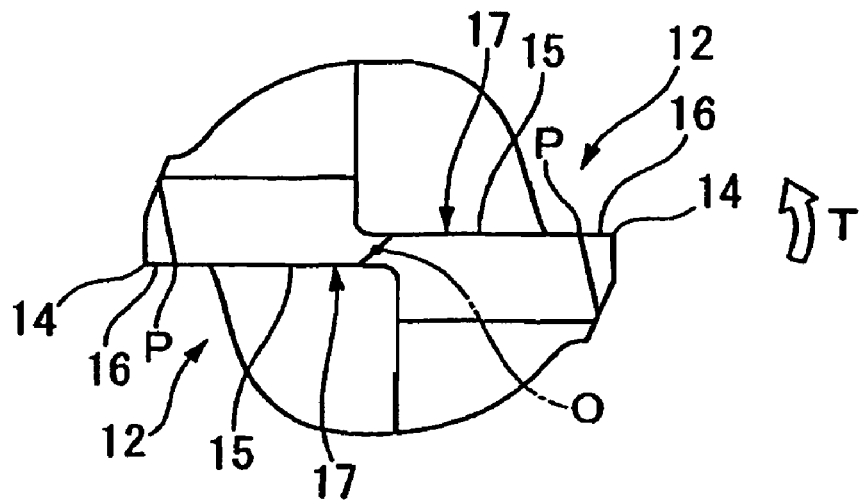
FIG. 7 is a front view as seen from the distal end in a direction of an axis O of the embodiment shown in FIG. 5.
Figure 8:
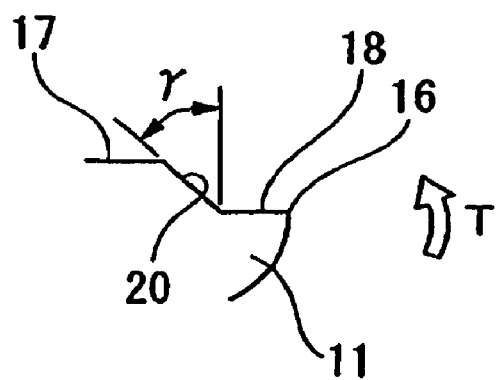
FIG. 8 is a cross-sectional view taken along the line Z-Z in FIG. 5.

Here, in the same manner as the step portions 19 of the first embodiment, as shown in FIG. 5, the step portions 20 of the second embodiment are formed so as to extend from the intersection point P between the end cutting edges 15 and the corner cutting edges 16 in a substantially perpendicular direction with respect to the end cutting edges 15. However, unlike in the first embodiment in which the step portions 19 are also perpendicular to the main gash faces 17 and sub gash faces 18, as shown in FIG. 8, at a cross section where they intersect with the axis O, the step portions 20 are formed as planar inclined faces that extend away from the main gash faces 17 at a constant angle of inclination as they move from the main gash faces 17 towards the sub gash faces 18. Moreover, in the present embodiment, as shown in FIG. 8, the angle of inclination of the inclined surface produced by the step portion 20 having the constant angle is set within a range of 30 to 60° as an angle of inclination $\gamma$ with respect to a direction that is perpendicular to the sub gash face 18 at a cross section that intersects the axis O.

Accordingly, in the radius end mill of the second embodiment that is formed in this manner, because the step portions 20 are formed as inclined faces that gradually extend away as they move from the main gash faces 17 side towards the sub gash face 18 side in the manner described above, the gradient of the step portions 20 as seen from the sub gash face 18 side is more gentle than that of the step portions 19 of the first embodiment. Accordingly, even if chips produced at the corner cutting edges 16 are discharged along the sub gash faces 18 and collide with the step portions 20, they are subjected to resistance by the step portions 20 and while being either curled or broken, are guided along the slope of the inclined surface formed by the step portion 20, and may be reliably discharged without causing any blockages.

Moreover, in the present embodiment, the angle of inclination $\gamma$ of the inclined surfaces formed by the step portions 20 are set within a range of 30 to 60° with respect to a direction that is perpendicular to the sub gash face 18. As a result, as is described above, chip blockages may be reliably prevented and a smooth discharge achieved, while at the same time sufficient resistance is imparted to the chips and smooth processing of the chips, such as the curling or breaking thereof, may be achieved. Here, if the rise of the step portions 20 is a steep gradient so as to approach the vertical resulting in the angle of inclination $\gamma$ being reduced so as to be less than 30°, then there is a possibility of it not being possible to sufficiently prevent chip blockages. If, however, the inclination is flattened so that the angle of inclination $\gamma$ is more than 60°, then the resistance that is imparted to collided chips is too small, and there is a possibility that reliable processing will not be obtainable.

Figure 9:
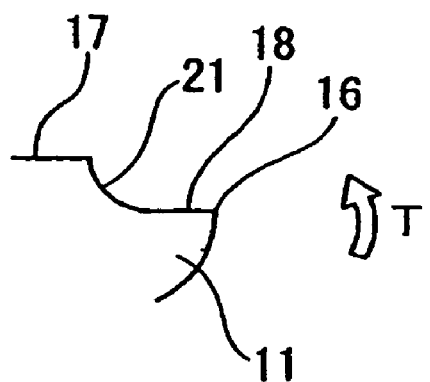
FIG. 9 shows a third embodiment of the present invention, and corresponds to the cross-sectional view taken along the line Z-Z in FIG. 5.

In this second embodiment, the step portions 20 are formed as planar inclined surfaces having a constant angle of inclination $\gamma$, however, as in a third embodiment which is shown in FIG. 9, it is also possible to form step portions 21 as concave curved surfaces, and to make the angle of inclination of the step portions 21 with respect to a direction that is perpendicular to the sub gash face 18 gradually smaller as it moves from the sub gash face 18 side to the main gash face 17 side. Note that FIG. 9 is a view corresponding to the cross section taken along the line Z-Z in FIG. 5 of the second embodiment, and portions that are the same as those in the second embodiment are given the same reference symbols.

Accordingly, in this third embodiment as well, because the step portions 21 are formed as inclined surfaces that are gradually extend away as they move from the main gash face 17 side to the sub gash face 18 side, the same effects as those of the second embodiment may be obtained. In addition, because the inclination as seen from the sub gash face 18 side becomes a gradually steeper gradient as it moves towards the main gash face 17 side, while chips that are discharged over the sub gash face 18 collide at first against the gentle gradient portion of the step portion 21 so that blockages may be reliably prevented, they are then pushed as they are so as to be guided to the steep gradient portion of the main gash face 17 side and gradually become subject to resistance. As a result, they are more efficiently curled or broken, and disposed of Namely, according to the radius end mill of the third embodiment, this radius end mill is more effective in that it achieves both the excellent chip disposal performance of the first embodiment and the smooth chip discharge performance of the second embodiment.

Next, FIGS. 10 through 17 show a fourth embodiment when the present invention, in which the sub gash faces 18 are formed via the step portions 19, 20, and 21 on the outer circumferential side of the main gash faces 17 in the manner described above, is applied to a throw away type of radius end mill. Note that, in this fourth embodiment as well, component elements that are the same as in the above first through third embodiments are given the same reference symbols and the description thereof is abbreviated.

Namely, in the first through third embodiments, the chip discharge flutes 12, main and sub gash faces 17 and 18, step portions 19, 20, and 21, peripheral cutting edges 14, end cutting edges 15, and corner cutting edges 16 are formed directly on the circular cylinder-shaped tool body 11 that is formed from a hard material such as a cemented carbide. However, in the fourth embodiment, the tool body 11 is constructed by forming an insert mounting seat 32 at a distal end portion of a circular cylinder-shaped holder 31, and removably mounting an indexable insert 33 on this insert mounting seat 32 using an insert clamp mechanism 34. The above described chip discharge flutes 12, main and sub gash faces 17 and 18, step portions 19, 20, and 21, peripheral cutting edges 14, end cutting edges 15, and corner cutting edges 16 are formed on the indexable insert 33. Note that the holder 31 is formed from a steel material or the like, and the indexable insert 33 is formed from a hard material such as cemented carbide.

Here, a distal end portion of the holder 31 is formed in a hemispherical shape. The insert mounting seat 32 is formed as a concave groove that extends in one direction that is orthogonal to the axis O by cutting the distal end portion of the holder 31 along a plane that includes the axis O of the tool body 11 such that it is open on the distal end side. The insert mounting seat 32 is formed by a pair of wall surfaces 35 and 36 that are parallel with the axis O and are also parallel with each other such that they face each other, and an end surface 37 that is perpendicular to the wall surfaces 35 and 36 and is also perpendicular to the axis O while facing the distal end side of the holder 31.

The indexable insert 33 is formed in a substantially quadrangular planar shape that is able to be fitted into the concave groove-shaped insert mounting seat 32. The indexable insert 33 is provided with a pair of side surfaces 38 and 39 that are parallel to each other and are in tight contact with the wall surfaces 35 and 36 when the indexable insert 33 has been fitted, and with a rear end surface 40 that is perpendicular to the side surfaces 38 and 39 and is in tight contact with the end surface 37. Furthermore, a mounting hole 41 having a circular cross section that penetrates the indexable insert 33 substantially in the center thereof perpendicularly to the side surfaces 38 and 39 is formed between the side surfaces 38 and 39.

When the tool body 11 has been formed by fitting the indexable insert 33 into the insert mounting seat 32 and fixing it in position using the clamp mechanism 34, chip discharge flutes 12 are formed respectively in a spiral configuration on a pair of circumferential surfaces of the indexable insert 33 that are positioned on an outer periphery of the distal end portion of the tool body 11. In addition, peripheral cutting edges 14 are formed at side ridge portions on the outer circumferential side of the wall surfaces 13 that face the tool rotation direction T side, the main gash faces 17 are formed on an inner circumferential side at the distal end, and the end cutting edges 15 are formed at side ridge portions on the distal end side thereof The sub gash faces 18 are formed via the step portions 19, 20, or 21 on the outer circumferential side of the main gash faces 17. Convex arc-shaped corner cutting edges 16 are formed on the side ridge portions extending from the distal end of the sub gash faces 18 to the outer periphery thereof.

When an indexable insert 33 that has been fitted into the insert mounting seat 32 is positioned such that a center line X of the mounting hole 41 is orthogonal to the axis O of the tool body 11, and is fixed in place by the clamp mechanism 34, and when the tool body 11 has been constructed in this manner, a symmetrical configuration is formed around the axis O.

Moreover, out of the hemispherical distal end portion of the holder 31, that portion that is adjacent to the tool rotation direction T side of the pair of chip discharge flutes 12 of the indexable insert 33 is formed as a notched portion 31A by a cylindrical surface whose radius is greater than the radius of this hemisphere.

Accordingly, in the indexable insert type of radius end mill of the fourth embodiment as well in which the peripheral cutting edges 14, the end cutting edges 15, the corner cutting edges 16, the main gash face 17, the sub gash face 18, and the step portions 19, 20, and 21 are formed on the indexable insert 33, it is possible to obtain the same effects as in the first through third embodiments in accordance with the form of the step portions 19, 20, and 21.

In the clamp mechanism 34 of the present embodiment, by screwing a clamp screw 42 that is inserted from one side (i.e., the wall surface 36 side) of the distal end portion of the holder 31 that is separated into the wall surface 35 side and the wall surface 36 side with the insert mounting seat 32 in-between and penetrates the indexable insert 33 to reach the other side (i.e., the wall surface 35 side) in order to clamp the indexable insert 33 that has been fitted into the insert mounting seat 32, not only is the distal end portion of the holder 31 elastically deformed so as to sandwich the indexable insert 33, but the clamp screw 42 itself is also elastically deformed and is bent in a direction that intersects the screwing-in direction. As a result, the indexable insert 33 is pushed in the bending direction and is clamped.

Here, the clamp screw 42 has a male thread portion 42A at one end thereof and has a flat countersunk head portion 42B whose underside is in the form of a cone at the other end thereof Between the male threaded portion 42A and the head portion 42B is formed a columnar shaft portion 42C that has an external diameter that enables it to be press-fitted inside the mounting hole 41, and has an axial length that is slightly longer than the gap between the wall surfaces 35 and 36 of the insert mounting seat 32.

Moreover, in one of the portions of the distal end portion of the holder 31, which is separated by the concave groove-shaped insert mounting seat 32, that is on the wall surface 35 side (i.e., the aforementioned portion on the other side) of the insert mounting seat 32 is formed a screw hole 43 that penetrates this portion so as to be perpendicular to the wall surface 35. The screw hole 43 is formed so as to be coaxial with the center line X of the indexable insert 33 that has been positioned in the manner described above. The portion of this screw hole 42 that opens onto the wall surface 35 is formed as a cross-sectionally circular hole 43A that has the same internal diameter as the mounting hole 41 of the indexable insert 33, and is formed such that the end portion on the male threaded portion 42A side of the shaft portion 42C of the clamp screw 42 is able to be press-inserted therein. A female threaded portion 43B into which the male threaded portion 42A of the clamp screw 42 is threaded is formed in the portion on the opposite side from the wall portion 35 that is beyond the circular hole 43A.

In that portion of the distal end portion of the holder 31 that is on the wall surface 36 side (i.e., the aforementioned portion on the one side) of the insert mounting seat 32 as well is formed a through hole 44, into which the clamp screw 42 is inserted, perpendicularly to the wall surface 36 so as to penetrate that portion. This through hole 44 is an elongated hole that is formed such that, at any position in the center line X direction of the indexable insert 33 that has been positioned in the manner described above, a cross-section thereof that is parallel to the wall surface 36 is in the shape of an elongated hole having a major axis that extends in a direction that is parallel to the axis O, as shown in FIG. 17, namely, in a direction that intersects the center line X direction in which the clamp screw 42 is threaded. Moreover, the center of that half arc portion of the circumference of the ellipse that is on the distal end side (i.e., the left side in FIG. 17) of the tool body 11 is positioned on the center line X, and this distal end side half arc portion and the rear end side half arc portion are connected together by a pair of tangent lines at both ends of these half arcs that are in parallel with the major axis and also in parallel with each other.

Furthermore, the portion of the through hole 44 that opens onto the wall surface 36 is set to the same size as the inner diameter (i.e., the diameter) of the half arc of the ellipse formed by the aforementioned cross section, and the gap between the pair of tangent lines, namely, the width W of the ellipse is set to the same size as the inner diameter (i.e., the diameter) E of the circular hole 43A of the screw hole 43 of the wall surface 35 on the opposite side and as the inner diameter (i.e., the diameter) of the mounting hole 41 in the indexable insert 33, and the shaft portion 42C of the clamp screw 42 is formed as an engaging portion 44A that has a width that enables it to be press-inserted between at least the pair of tangent line portions. Moreover, the portion on the opposite side from the wall surface 36 that is beyond this engaging portion 44A forms an inclined portion 44B that is inclined such that a radius of a half arc of the ellipse formed by the cross section thereof and the interval between the pair of tangent lines become gradually larger as they move towards the opposite side from the wall surface 36. The angle of inclination of this inclined portion 44B is equal to the taper angle of the conical surface formed by the underside of the head portion 42B of the clamp screw 42.

Note that, in an aperture portion 44C that opens onto an outer periphery of the distal end portion of the holder 31 on the opposite side from the wall surface 36 beyond the inclined portion 44B, the inner diameter (i.e., the diameter) of a half arc of the ellipse formed by the cross section of the insertion hole 44 and the interval between the tangent lines is set at a uniform size that is larger than the diameter of the head portion 42B. Moreover, in order to make the distal end portion of the holder 31 easily elastically deformable, a narrow slit 45 that forms a hollow sinking from the end surface 37 towards the rear end side of the tool body 11 is formed extending in parallel with the wall surface 36 on the wall surface 36 side of the end surface 37 of the insert mounting seat 32.

In this type of clamp mechanism 34, by inserting the indexable insert 33 into the insert mounting seat 32 such that, as is described above, the center line X of the mounting hole 41 is orthogonal to the axis O, the mounting hole 41 and the circular hole 43A of the screw hole 43 that both have the same inner diameter (i.e., diameter) E, as well as the half arc portion of the cross section of the distal end side of the tool body 11 of the engaging portion 44A of the insertion hole 44 are both positioned above the inner surface of the same cylinder that has its center on the center line X. Therefore, if the clamp screw 42 that has been inserted from the aperture portion 44C side of the insertion hole 44 is inserted through the mounting hole 41, and the male threaded portion 42A thereof is screwed into the female threaded portion 43B of the screw hole 43, the columnar shaft portion 42C of the clamp screw 42 is fitted so as to be in tight contact with the inner surface of the cylinder, and the indexable insert 33 is placed in position.

In addition, if the clamp screw 42 is screwed in further, the conical surface of the underside of the head portion 42B presses the portion having a half arc cross section at the distal end side of the tool body 11 of the inclined portion 44B of the insertion hole 44. As a result, the distal end portion of the holder 31 on the wall surface 36 side where the insertion hole 44 is formed is slightly elastically deformed towards the wall surface 35 side, so that the side surfaces 38 and 39 are pressed by the two wall surface 35 and 36. As a result, the indexable insert 33 is sandwiched in the insert mounting seat 32 and fixed in position.

At the same time as this, in the clamp screw 42, a portion extending from the head portion 42B to the shaft portion 42C is slightly elastically deformed by a reaction force against the force with which the conical surface of the underside of the head portion 42B presses against the distal end side of the inclined portion 44B of the insertion hole 44 so as to bend towards the rear end side of the tool body 11 along the major axis of the ellipse formed by the cross section of the insertion hole 44. In addition, because, in conjunction with this, the inner circumferential surface of the mounting hole 41 into which the shaft portion 42C has been inserted is also pushed in the direction in which the clamp screw 42 is bent, the indexable insert 33 is also subjected to pressing force towards the rear end side of the tool body II such that the rear end surface 40 of the indexable insert 33 is pushed against the end surface 37 of the insert mounting seat 32, thereby more firmly fixing the indexable insert 33 in position. Note that the end portion on the male threaded portion 42A side of the shaft portion 42C that has been inserted into the circular hole 43A of the screw hole 43 is not deformed, and the clamp screw 42 is bent such that the head portion 42B is tilted to the rear end side pivoting on the center of this portion.

If a case is hypothesized in which the ability to throw away the radius end mill as is described, for example, in Japanese Patent Application, Firs Publication No. S59-175915 has been achieved, and, in the same manner as in the present embodiment, a cutting edge is formed in an indexable insert that is fitted into a concave groove-shaped insert mounting seat that is formed in a holder, and the holder distal end portion and the clamp screw are elastically deformed by a clamp mechanism that is provided with a clamp screw that is inserted into a mounting hole in this indexable insert, thereby fixing the indexable insert in position, then this indexable insert is fixed in position in the axial direction of the tool body by being pressed against the insert mounting seat end surface by the bending of the clamp screw. Moreover, the indexable insert is also fixed in position in the direction of the center line of the mounting hole in the indexable insert, which is orthogonal to the above axial direction, by the two wall surfaces of the insert mounting seat sandwiching and also pressing the indexable insert.

However, in a direction that is orthogonal to both the axis of the tool body and the direction of the center line in the mounting hole, namely, in the direction in which the concave groove-shaped insert mounting seat that is formed in the distal end portion of the holder extends, the indexable insert is only supported by the shaft portion of the clamp screw that is inserted into the mounting hole in the indexable insert. Conversely, in order to make this shaft portion of the clamp screw elastically deformable, the insertion hole in the distal end portion of the holder into which the portion of the shaft portion that is elastically deformed is inserted must be made larger than the outer diameter of this shaft portion. Therefore, for example, if the insertion hole in the distal end portion of the holder is simply made larger than the outer diameter of the shaft portion, then when the indexable insert is positioned and then fixed in position by screwing in the clamp screw, or when a load is applied during a cutting operation, the clamp screw is also bent in the direction in which the insert mounting seat extends so that there is a possibility of the indexable insert working loose and the work accuracy deteriorating markedly.

Therefore, in the present embodiment, as is described above, by forming the insertion hole 44 on the wall surface 36 side of the distal end portion of the holder 31 into which the clamp screw 42 is inserted such that it has an elliptical cross section, and by forming the engaging portion 44A in the insertion hole 44 such that it has a width W that allows the shaft portion 42C of the clamp screw 42 to be fitted inside it, while bending in the direction of the axis O due to elastic deformation of the clamp screw 42 is still allowed, bending of the clamp screw 42 in the direction in which the insert mounting seat 32 extends, which is perpendicular to both the axis O direction and the center line X direction (i.e., the direction in which the clamp screw 42 is screwed in), is restricted as a result of the shaft portion 42C being engaged with the engaging portion 44A in this direction.

Namely, in the present embodiment, in order to prevent any deterioration in the processing accuracy that is caused by slipping of the indexable insert 33 as is described above, by screwing in the clamp screw 42 that is inserted from the one side of the distal end portion of the holder 31, which has the insert mounting seat 32 sandwiched between it, and penetrates the indexable insert 33 such that the clamp screw 42 is screwed in as far as the other side of the distal end portion of the holder 31, the clamp mechanism 34 of the indexable insert 33 sandwiches the indexable insert 33, which has been fitted into the concave groove-shaped insert mounting seat 32 that is formed in the distal end portion of the holder 31, between both sides of the distal end portion of the holder 31, and clamps the indexable insert 33 by pushing it in the bending direction of the clamp screw 42 by bending the clamp screw 42 in a direction that intersects the direction in which the clamp screw 42 is screwed in. This clamp mechanism 34 for an indexable insert 33 is also characterized in that an engaging portion 44A having the shape of an elongated hole that, in a state in which the clamp screw 42 is screwed in to the other side of the distal end portion of the holder 31, has a width W that enables the shaft portion 42C of the clamp screw 42 to be inserted therein and that extends in the bending direction is formed in the insertion hole 44 that is formed in one side of the distal end portion of the holder 31 and into which is inserted the clamp screw 42.

Accordingly, as a result of the shaft portion 42C engaging with this engaging portion 44A, the clamp screw 42 is no longer bent in any direction other than the bending direction out of all the directions that intersect the screwing in direction of the clamp screw 42, and it is possible to prevent the indexable insert 33 from slipping while the clamp screw 42 is being screwed in or during a cutting operation. As a result, a cutting operation may be performed while the indexable insert 33 is being held with accuracy symmetrically around the axis O of the tool body 11, thereby enabling a high degree of processing accuracy to be obtained.

Moreover, in the present embodiment, a circular hole 43A into which the end portion of the shaft portion 42C is able to be inserted is formed in the screw hole 43 that is formed on the other side of the distal end portion of the holder 31 and into which the clamp screw 42 is screwed. Accordingly, there is no load from bending on the male threaded portion 42A of the clamp screw 42 that is formed on this end portion side, and it is possible to bend the shaft portion 42C around this end portion, and damage to the clamp screw 42 may be prevented. In addition, because the inner diameter (i.e., the diameter) E of the circular hole 43A and the width W of the engaging portion 44A are made equal, and because the shaft portion 42C of the clamp screw 42 that is fitted into the circular hole 43A and the engaging portion 44A is also formed as a circular column having a fixed outer diameter, load caused by bending is reduced in this shaft portion 42C as well, and the shaft portion 42C may be uniformly bent so that damage thereto may be prevented.

Furthermore, a cross section of the engaging portion 44A is formed as an elongated hole, and the side of the engaging portion 44A that is on the distal end side of the tool body 11, namely, the opposite side from the bending direction is formed as a half arc of the inner diameter (i.e., the diameter) E that is equal to the circular hole 43A, and, as is described above, is positioned on the same cylindrical surface as the circular hole 43A. As a result, when the circular hole 43A and the engaging portion 44A are being formed, firstly, a hole is made in the cylindrical surface portion of the inner diameter E using a drill or the like, so as to form the half arc portions of the circular hole 43A and the engaging portion 44A. Next, a cutting operation is performed using an end mill or the like at the inner diameter (i.e., the diameter) E of the cylindrical surface, namely, at the width W of the engaging portion 44A such that the engaging portion 44A is widened in the above described bending direction. The advantage may also be obtained that the processing to form the circular hole 43A and the engaging portion 44A accurately is simple.

Note that the clamp mechanism 34 itself of the above described type of indexable insert 33 may also be applied, in addition to the indexable type of radius end mill of the present embodiment, to indexable types of ball end mill and square end mill, or to various indexable types of cutting tool in addition to these.

Next, FIGS. 18 through 30 show a fifth through eighth embodiments of the present invention that relate to a radius end mill in which an inner edge of a rake face of an end cutting edge and an inner edge of a rake face of a corner cutting edge are formed as a smoothly continuous single convex curve.

As is shown in FIGS. 18 through 21, the radius end mill according to the fifth embodiment has a substantially columnar shaped tool body 50 that is formed from a hard material such as a cemented carbide and is rotated around an axis O. Note that the tool body 50 as well is formed so as to have a rotationally symmetric configuration around the axis O.

For example, two chip discharge flutes 51 are formed substantially equidistantly in the circumferential direction on an outer circumference of the tool body 50 so as to be open to the outer circumferential surface of the tool body 50. The two chip discharge flutes 51 are formed such that, as they move towards the rear end side in the direction of the axis O, they are helically twisted at a predetermined twist angle θ around the axis O towards the rear in the tool rotation direction T.

For example, two gashes 52 are formed equidistantly in the circumferential direction at a distal end of the tool body 50 so as to be open to the distal end surface of the tool body 50 and so as to separate this distal end surface into a plurality of segments. In the same manner as the chip discharge flutes 51, the two gashes 52 are formed such that, as they move towards the rear end side in the direction of the axis O, they are twisted towards the rear in the tool rotation direction T.

The rear end portions of the gashes 52 are made continuous with the distal end portions of the chip discharge flutes 51, and the gashes 52 and chip discharge flutes 51 are in a state of communicating with each other.

Moreover, wall surfaces that face towards the front side in the tool rotation direction T of the chip discharge flutes 51 that are formed on an outer circumference of the tool body 50 are formed as outer circumferential rake faces 51A. Peripheral cutting edges 54 are formed on ridge line portions that are positioned at an outer circumferential side of the outer circumferential rake faces 51A, namely, are positioned on intersecting ridge line portions between the outer circumferential rakes faces 51A and outer circumferential flank faces 53 that intersect with the outer circumferential rake faces 51A and face towards the outer circumferential side of the tool body.

Here, because the rear end portions of the gashes 52, which are formed at the distal end of the tool body 50, are formed so as to be continuous with the distal end portions of the chip discharge flutes 51, rear end portions in the direction of the axis O of the wall surfaces of the gashes 52 that face towards the front in the tool rotation direction T extend as far as the distal end portions of the outer circumferential rake faces 51A, which are wall surfaces that face forwards in the tool rotation direction T of the chip discharge flutes 51, and the two are continuous with each other.

As a result, with rear end portions in the direction of the axis O of the wall surfaces that face forwards in the tool rotation direction T of the gashes 52 forming outer circumferential distal end portion rake faces 52C, portions on the distal end side of the peripheral cutting edges 54 (i.e., peripheral cutting edge distal end portions 54A) are formed in outer circumferential ridge line portions of these outer circumferential distal end portion rake faces 52C, namely, in intersection ridge line portions where the outer circumferential distal end portion rake faces 52C intersect with the outer circumferential flank faces 53 that face the outer circumferential side of the tool body 50.

Moreover, portions on the inner circumferential side of the tool body 50 of the distal end portions in the direction of the axis O of the wall surfaces that face forwards in the tool rotation direction T of the gashes 52 form distal end rake faces 52A, while portions on the outer circumferential side of the tool body 50 of the distal end portions in the direction of the axis O of the wall surfaces that face forwards in the tool rotation direction T of the gashes 52 form corner rake faces 52B.

In addition, end cutting edges 56 that extend to the outer circumferential side of the tool body 50 from the vicinity of the axis O are formed on ridge line portions that are positioned on the distal end side of the distal end rake faces 52A, namely, are positioned on intersecting ridge line portions between the distal end rake faces 52A and distal end flank faces 55 that intersect with the distal end rake faces 52A and face towards the distal end side in the direction of the axis O. Note that the end cutting edges 56 are slightly slanted so as to approach the distal end side in the direction of the axis O as they move towards the outer circumferential side of the tool body 50 from the vicinity of the axis O.

Furthermore, substantially quarter arc-shaped corner cutting edges 58 are formed on ridge line portions that are positioned on the outer circumferential side of the distal end of the corner rake faces 52B, namely, are positioned on intersecting ridge line portions between the corner rake faces 52B and corner flank faces 57 that intersect with the corner rake faces 52B and face towards the outer circumferential side of the tool body 50 and towards the distal end side in the direction of the axis O.

Note that a radius of curvature "r" of the substantially arc-shaped portions formed by the corner cutting edges 58 is set such that a ratio r/D between the radius of curvature "r" and a diameter D of the tool body 50 (i.e., the diameter of a circle S1 that touches the exterior of a cross section that is orthogonal to the axis O of the tool body 50: see FIG. 21) is 0.2 or more, while "r" is also set such that a ratio between "r" and the diameter D and web thickness "d" (i.e., the diameter of a circle S2 that touches the interior of a cross section that is orthogonal to the axis O of the tool body 50: see FIG. 21) is (D−d)/2 or more.

The end cutting edges 56 are smoothly continuous with the peripheral cutting edges 54 via the substantially quarter arc-shaped corner cutting edges 58. Namely, the substantially quarter arc-shaped corner cutting edges 58 constitute an intersecting portion (i.e., a corner portion) where the end cutting edges 56 and the peripheral cutting edges 54 each intersect, and the radius end mill of this fifth embodiment is a two-edge radius end mill that has two cutting edges that are smoothly continuous from the end cutting edges 56 to the peripheral cutting edges 54 via the corner cutting edge 58.

In each of these two cutting edges, when seen from the distal end side in the direction of the axis O, the end cutting edges 56 and corner cutting edges 58 present a gentle convex curve that protrudes forwards in the tool rotation direction T, while because the chip discharge flutes 51 and the gashes 52 are formed in a twisted shape as is described above, the corner cutting edges 58 and peripheral cutting edges 54 are formed so as to twist towards the rear in the tool rotation direction T as they move towards the rear end side in the direction of the axis O.

In addition, in the present embodiment, if the tool body 50 is viewed from a direction that is orthogonal to the axis O and that faces the wall surfaces (i.e., the distal end gash face 52A, the corner gash face 52B, and the outer circumferential distal end portion rake face 52C) of the gash 52 that face forwards in the tool rotation direction T, as shown in FIG. 18, the inner edge 59A of the distal end rake face 52A (i.e., the boundary edge between the distal end rake face 52A and a wall surface 52D of the gash 52 that stands out on the forward side in the tool rotation direction T of the distal end rake face 52A), the inner edge 59B of the corner rake face 52B (i.e., the boundary edge between the corner rake face 52B and a wall surface 52D of the gash 52 that stands out on the forward side in the tool rotation direction T of the corner rake face 52B), and the inner edge 59C of the outer circumferential distal end portion rake face 52C (i.e., the boundary edge between the outer circumferential distal end portion rake face 52C and a wall surface of the chip discharge flutes 51 that stands out on the forward side in the tool rotation direction T of the outer circumferential distal end portion rake face 52C) are smoothly continuous with each other, so that altogether they form a single convex curve that protrudes towards the corner cutting edge 58 side. However, the radius of curvature of the convex curve formed by the inner edges 59A, 59B, and 59C is greater than the radius of curvature "r" of the substantially arc shape formed by the corner cutting edge 58.

In conjunction with this, the distal end rake face 52A, the corner rake face 52B, and the outer circumferential distal end portion rake face 52C, which are wall surfaces that face forwards in the tool rotation direction T of the gashes 52 are also formed as a smoothly continuous single curved surface.

Note that, for the rake angle in the axial direction (i.e., the angle formed by the direction of the axis O and the rake face, with a positive inclination that moves towards the rearward side in the tool rotation direction T as it moves towards the rear end side in the direction of the axis O) of the rake face (i.e., the distal end rake face 52A, the corner rake face 52B, and the outer circumferential distal end portion rake face 52C) that is formed by this single curved surface, the axial direction rake angle $\delta$ in the vicinity of the end cutting edges 56 is set within a range of $0° \leq \delta \leq 20°$, and the axial direction rake angle $\epsilon$ in the vicinity of the peripheral cutting edge distal end portions 54A is set so as to satisfy the range of $\delta < \epsilon$ and $0° \leq (\theta - \epsilon) \leq 10°$ due to its relationship with the axial direction rake angle δ in the vicinity of the end cutting edges 56 and the twist angle θ of the chip discharge flutes 51.

According to the radius end mill of the fifth embodiment constructed in the above described manner, because the inner edge 59A of the distal end rake face 52A, the inner edge 59B of the corner rake face 52B, and the inner edge 59C of the outer circumferential distal end portion rake face 52C are formed as a single smoothly continuous convex curve, unlike the conventional structure, there is no corner portion formed by the inner edges of the rake faces intersecting each other on these rakes faces (i.e., on the distal end rake face 52A, the corner rake face 52B, and the outer circumferential distal end portion rake face 52C).

As a result, it is possible to increase the spacings between the end cutting edges 56, the corner cutting edges 58, and the peripheral cutting edge distal end portions 54A and the inner edges 59A, 59B, and 59C of the rake faces thereof by the amount obtained by obviating these corner portions. Namely, by securing a sufficiently large space for the gashes 52 that are formed in the tool body 50, and by sufficiently enlarging the space for discharging chips, it is possible to maintain an excellent chip discharge performance when cutting a work piece.

In the same manner, as a result of the inner edges 59A, 59B, and 59C of the rake faces (i.e., of the distal end rake face 52A, the corner rake face 52B, and the outer circumferential distal end portion rake face 52C) being formed as a single continuous convex curve, when chips that are generated by the cutting of a work piece are discharged, there is no place (i.e., corner portion) where these chips may become caught, and the chips may be discharged smoothly. Because of this as well, it is possible to maintain an excellent chip discharge performance.

In addition, in this fifth embodiment, because the distal end rake face 52A, the corner rake face 52B, and the outer circumferential distal end portion rake face 52C are smoothly continuous with each other so as to form a single curved surface without any differences in level, chips generated by the cutting of a work piece may be made to pass smoothly over the rakes faces 52A, 52B, and 52C, resulting in a further improvement in the chip discharge performance being made possible.

Moreover, if these rake faces 52A, 52B, and 52C are formed as a continuous curved surface with no differences in level, it is also possible to achieve an improvement in the operating accuracy of the corner portions and a reduction in manufacturing time.

Here, while in the radius end mill of this fifth embodiment, because the ratio r/D between the radius of curvature "r" of the substantially arc-shaped portions formed by the corner cutting edges 58 and a diameter D of the tool body 50 is set to 0.2 or more, and the radius of curvature "r" of the corner cutting edges 58 is (D−d)/2 or more with respect to the diameter D and web thickness "d" of the tool body 50, and because the substantially arc-shaped corner cutting edges 58 are formed comparatively larger, conventionally, there was a tendency for the spacings between the corner cutting edges 58, end cutting edges 56, and peripheral cutting edge distal end portions 54A and the inner edges 59A, 59B, and 59C of the rakes faces thereof to be too large, and it has not been possible to form gashes 52 having a sufficient size so that the chip discharge performance was deteriorated. In contrast to this, the problem of the chip discharge performance may be solved by the effect that is obtained due to the fact that the inner edges 59A, 59B, and 59C form a single continuous convex curve, and by the effect that is obtained due to the fact that the rake faces 52A, 52B, and 52C form a single continuous curved surface.

In this manner, the present invention in which the inner edge 59A of the rake face 52A of the end cutting edge 56 and the inner edge 59B of the rake face 52B of the corner cutting edge 58 are formed as a smoothly continuous convex curve exhibits a greater effect in cases such as when the ratio r/D between the radius of curvature "r" of the substantially arc-shaped portion formed by the corner cutting edges 58 and the diameter D of the tool body 50 is set to 0.2 or more, and in cases such as when the radius of curvature "r" of the substantially arc-shaped portions formed by the corner cutting edges 58 is set to (D−d)/2 or more for the diameter D and web thickness "d" of the tool body 50. However, if a particularly conspicuous effect is anticipated, the present invention may also be applied to a radius end mill in which the ratio r/D is set to 0.3 or more or in which the radius of curvature "r" is set to (D−d)/2 or more.

Cases such as these (i.e., when the ratio r/D is 0.3 or more) are now described as a sixth embodiment of the present invention with reference made to FIGS. 22 through 24 (portions that are the same as those of the above fifth embodiment are given the same reference symbols and a description thereof is omitted).

In the radius end mill according to the sixth embodiment, chip discharge flutes are not formed on an outer circumference of the tool body 50, while rear end portions of the gashes 52 that are formed at the distal end of the tool body 50 are formed so as to be cut upwards to the outer circumferential surface of the tool body 50.

Moreover, rear end portions in the direction of the axis O of the wall surfaces of the gashes 52 that face forwards in the tool rotation direction T form outer circumferential rake faces 52C, while peripheral cutting edges 54 are formed on ridge line portions (i.e., on intersecting ridge line portions between the outer circumferential rake faces 52C and the outer circumferential flank faces 53) that are positioned on the outer circumferential side thereof.

Furthermore, portions on the inner circumferential side of the tool body 50 of the distal end portions in the direction of the axis O of the wall surfaces that face forwards in the tool rotation direction T of the gashes 52 form distal end rake faces 52A, and end cutting edges 56 are formed on ridge line portions that are positions on the distal end side thereof, while portions on the outer circumferential side of the tool body 50 of the distal end portions in the direction of the axis O of the wall surfaces that face forwards in the tool rotation direction T of the gashes 52 form corner rake faces 52B. Substantially quarter arc-shaped corner cutting edges 58 are formed on ridge line portions that are positioned on the outer circumferential side of the distal end of the corner rake faces 52B.

The substantially quarter arc-shaped corner cutting edges 58 constitute an intersecting portion (i.e., a corner portion) where the end cutting edges 56 and the peripheral cutting edges 54 each intersect, and in the radius end mill of this sixth embodiment, the ratio r/D between the radius of curvature "r" of the substantially arc-shaped portion formed by the corner cutting edges 58 and the diameter D of the tool body 50 is set to 0.3 or more.

In the radius end mill according to this sixth embodiment as well, by forming the inner edge 59A of the distal end rake face 52A, the inner edge 59B of the corner rake face 52B, and the inner edge 59C of the outer circumferential rake face 52C (i.e., a boundary line between the outer circumferential rake face 52C and the wall surface of the gash 52D that protrudes towards the front in the tool rotation direction T from the outer circumferential rake face 52C) as a single continuous convex curve, and by forming the distal end rake face 52A, the corner rake face 52B, and the outer circumferential rake face 52C as a single continuous curved surface, the same effects as those of the above described fifth embodiment may be obtained.

In particular, in the radius end mill according to the sixth embodiment, because the ratio r/D between the radius of curvature "r" of the substantially arc-shaped portions formed by the corner cutting edges 58 and the diameter D of the tool body 50 is set to 0.3 or more, and because the substantially arc-shaped corner cutting edges 58 are formed having an extremely large size. In a case such as this, if the internal edges intersect at an obtuse angle and forming a corner portion, as in a conventional radius end mill, it is not possible to avoid the spacing between the corner cutting edges 58, end cutting edges 56, and peripheral cutting edges 54 and the inner edges 59A, 59B, and 59C of these rake faces from becoming extremely small, and the space for the gashes 52 is decreased so that the chip discharge performance deteriorates into an extremely poor state. However, in this very type of situation, by applying the present invention, it is possible to usefully exhibit the improved effects in the chip discharge performance that are obtained by the fact that the inner edges 59A, 59B, and 59C form a single continuous convex curve, and by the fact that the rake faces 52A, 52B, and 52C form a continuous curved surface.

Furthermore, FIGS. 25 through 30 show a seventh embodiment in which the radius end mill of the present invention, in which the inner edge 59A of the rake face 52A of the end cutting edge 56 and the inner edge 59B of the rake face 52B of the corner cutting edge 58 are formed as a single smoothly continuous curve, is formed as a indexable type in the same manner as in the fourth embodiment. Moreover, in the same manner as in the sixth embodiment, in particular, a case is shown in which the radius of curvature "r" of the substantially arc-shaped portions formed by the corner cutting edges 58 and the diameter D of the tool body 50 is set to 0.3 or more.

Namely, in the seventh embodiment as well, The tool body 50 is constructed by forming a concave groove-shaped insert mounting seat 32 in a distal end portion of a holder 31 that is shaped as a circular column formed from steel or the like, and then fitting a planar indexable insert 60 that is made from a hard material such as a cemented carbide into this insert mounting seat 32, and attaching it such that it may be removed therefrom using the insert clamp mechanism 34.

In addition, the end cutting edges 56 and the substantially arc-shaped corner cutting edges 58 are formed in the above described indexable insert 60 of the tool body 50 that is constructed in this manner, and the inner edge 59A of the rake face 52A of this end cutting edge 56 and the inner edge 59B of the rake face 52B of the corner cutting edge 58 are formed as a single smoothly continuous concave curve, and the rake face 52A of the end cutting edge 56 and the rake face 52B of the corner cutting edge 58 are formed as a single smoothly continuous curved surface.

Note that, in this seventh embodiment, the remaining component elements that are the same as in the fifth and sixth embodiments are given the same reference symbols and a description thereof is omitted. Moreover, component elements of the above indexable insert 60 and clamp mechanism 34 that are the same as those of the indexable insert 33 and clamp mechanism 34 of the fourth embodiment are also given the same reference symbols and the description thereof is simplified. In particular, the drawings shown in FIGS. 16 and 17 are also used for the clamp mechanism 34 and a drawing thereof is omitted.

Furthermore, the seventh embodiment employs the same structure as that of the fifth embodiment for the peripheral cutting edges 54, namely, the rake faces (i.e., the outer circumferential distal end portion rake faces) 52C of the peripheral cutting edges 54A that are formed inside the gashes 52 on the distal end side of the peripheral cutting edges 54 form a single curved surface that is smoothly continuous with the rake faces 52A and 52B of the end cutting edges 56 and the corner cutting edges 58. Furthermore, the inner edges 59C of the outer circumferential distal end portion rake faces 52C form a single convex curve that is smoothly continuous with the inner edges 59A and 59B of the rake faces 52A and 52B.

Moreover, when the tool body 50 has been constructed, the indexable insert 60 is also formed so as to have a rotationally symmetric configuration around the axis O, and the outer diameter D of the tool body 50 in the present embodiment is a circular diameter that, when the tool body 50 has been constructed, is in contact with the exterior of a cross section of the distal end portion of the tool body 50 that is orthogonal to the axis O. In addition, the outer diameter D is the maximum diameter of the rotation trajectory around the axis O of the corner cutting edge 58 and the peripheral cutting edge 54 on the outer circumferential side of the indexable insert 60.

Accordingly, in the radius end mill according to this seventh embodiment as well, the same effects as those of the above described fifth and sixth embodiments may be obtained.

Moreover, in order to prevent any deterioration in the processing accuracy that is caused by slipping of the indexable insert 60 in the same manner as in the above described fourth embodiment, by screwing in the clamp screw 42 that is inserted from the one side of the distal end portion of the holder 31, which has the insert mounting seat 32 sandwiched between it, and penetrates the indexable insert 60 such that the clamp screw 42 is screwed in as far as the other side of the distal end portion of the holder 31, the clamp mechanism 34 of the indexable insert 60 of the seventh embodiment as well sandwiches the indexable insert 60, which has been fitted into the concave groove-shaped insert mounting seat 32 that is formed in the distal end portion of the holder 31, between both sides of the distal end portion of the holder 31, and clamps the indexable insert 60 by pushing it in the bending direction of the clamp screw 42 by bending the clamp screw 42 in a direction that intersects the direction in which the clamp screw 42 is screwed in. This clamp mechanism 34 for an indexable insert 60 is also characterized in that an engaging portion 44A having the shape of an elongated hole that, in a state in which the clamp screw 42 is screwed in to the other side of the distal end portion of the holder 31, has a width that enables the shaft portion 42C of the clamp screw 42 to be inserted therein and that extends in the bending direction is formed in the insertion hole 44 that is formed in one side of the distal end portion of the holder 31 and into which is inserted the clamp screw 42.

Furthermore, the fact that the circular hole 43A, into which the end portion of the shaft portion 42C is able to be inserted, is formed in the threaded hole 43 that is formed on the other side of the distal end portion of the holder 31 and into which the clamp screw 42 is screwed, the fact that the inner diameter (i.e., the diameter) E of the circular hole 43A and the width W of the engaging portion 44A are made equal as well as the fact that the shaft portion 42C of the clamp screw 42 that is fitted inside both the circular hole 43A with the engaging portion 44A is formed as a circular column having a constant outer diameter, and the fact that the engaging portion 44A is formed having an elliptical cross section and the opposite side thereof from the bending direction is formed as a half arc of the inner diameter (i.e., the diameter) E that is equal to the circular hole 43A, and is positioned on the same cylindrical surface as the circular hole 43A are all the same as in the clamp mechanism 34 of the fourth embodiment.

Accordingly, in the seventh embodiment as well, in the same manner as in the above described fourth embodiment, it is possible to prevent the indexable insert 60 from slipping while the clamp screw 42 is being screwed in or during a cutting operation, thereby enabling a high degree of processing accuracy to be obtained. Moreover, the effects are obtained that damage to the clamp screw 42 is prevented, and the circular hole 43A and engaging portion 44A may be formed accurately and easily.

Moreover, in the same manner as in the fourth embodiment, the clamp mechanism 34 itself of the above described indexable insert 60 may also be used, in addition to a radius end mill, in various indexable types of cutting tool including ball end mills and square end mills.

Furthermore, as is described above, the present invention is not limited to each of the above described first through seventh embodiments, and various combinations of the respective component elements of these embodiments may be made as is appropriate.

For example, in the first through fourth embodiments, the inner edges of the main gash faces 17 that correspond to the rake faces 52A of the end cutting edges 56 of the fifth through seventh embodiments, and the inner edges that are positioned on the inner side via the step portions 19, 20, and 21 from the sub gash faces 18 that correspond to the rake faces 52B of the corner cutting edges 58, or, in addition to these, the inner edges of the wall surfaces 13 that face the tool rotation direction T side of the chip discharge flutes 12 that correspond to the rake faces 51A (i.e., the outer circumferential distal end portion rake faces 54A) of the peripheral cutting edges 54 (i.e., the peripheral cutting edge distal end portions 54A) may also be formed as a single smoothly continuous convex curve. Alternatively, conversely, instead of the rakes faces 52A of the end cutting edges 56 and the rake faces 52B of the corner cutting edges 58 forming single smoothly continuous curved surfaces in the fifth through seventh embodiments, it is also possible to employ a structure in which, the sub gash faces 18 in which the angle of inclination with respect to the axis O is greater than that of the rake faces 52A, which correspond to the main gash faces 17 of the first through fourth embodiments, are formed so as to extend away via the step portions 19, 20, and 21 from the rakes faces 52A only in the vicinity of the corner cutting edges 58 of the rake faces 52B within a range whereby they do not reach the inner edges 59B. In this structure, the corner cutting edges 58 are formed so as to be continuous with the outer circumferential side of the end cutting edges 56 from the distal end to the outer circumference of the sub gash faces 18.

Accordingly, according to a radius end mill in which component elements of the first through fourth embodiments are combined with component elements of the fifth through seventh embodiments, chips that are easily disposed of by being curled or fragmented by the step portions 19, 20, and 21 of the first through fourth embodiments may be discharged easily by the inner edges 59A, 59B, and 59C that are formed as single smoothly continuous convex curves of the fifth through seventh embodiments. As a result, it is possible to achieve a further improvement in the chip processing performance.

INDUSTRIAL APPLICABILITY

The present invention relates to a radius end mill that is used for cutting work pieces such as, for example, metal dies.

According to the present invention, by forming a sub gash face, which has a larger angle of inclination with respect to the axis of the tool body than that of the main gash face located on the inner circumferential side, on the outer circumferential side of the distal end portion of a wall surface that faces in the tool rotation direction of the chip discharge flutes, the corner cutting edge that is formed on the distal end outer circumferential side ridge portion of this sub gash face may be provided with excellent sharpness, and it is possible, particularly when performing a cutting operation on the inclined face or curved face of a metal die, to achieve efficient cutting by reducing the cutting resistance. Moreover, by making the step portions formed between the sub gash faces and the main gash faces inclined faces that gradually extend away as they move from the main gash face side to the sub gash face side, it is possible to prevent the chips from becoming blocked by the step portions and to encourage a smooth chip discharge.

Moreover, by forming the inner edges of the rakes faces of the end cutting edges and the inner edges of the rake faces of the corner cutting edges as smoothly continuous single convex curves, according to the present invention, it is possible to secure a large space for discharging generated chips without any corner portions, where inner edges intersect with other, being formed, as is the case conventionally, and it becomes difficult for discharged chips to become caught. As a result, an excellent chip discharge performance may be maintained.

The invention claimed is:

1. A radius end mill in which end cutting edges and substantially arc-shaped corner cutting edges are formed on a tool body that is rotated around an axis, wherein:
    inner edges of rake faces of the end cutting edges and inner edges of rake faces of the corner cutting edges are formed as a single, smoothly continuous convex curve;
    a radii of curvature "r" of the substantially arc-shaped portions formed by the corner cutting edges is set to (D−d)/2 or more for a diameter D and a web thickness "d" of the tool body; and
    a ratio r/D between a radii of curvature "r" of the substantially arc-shaped portions formed by the corner cutting edges and the diameter D of the tool body is set to 0.2 or more.

2. A radius end mill according to claim 1, wherein the rake face of the end cutting edge and the rake face of the corner cutting edge are formed as a single, smoothly continuous curved surface.

* * * * *